(12) United States Patent
Chang et al.

(10) Patent No.: US 11,397,310 B2
(45) Date of Patent: Jul. 26, 2022

(54) OPTICAL IMAGE CAPTURING SYSTEM

(71) Applicant: Ability Opto-Electronics Technology Co., Ltd., Taichung (TW)

(72) Inventors: Yeong-Ming Chang, Taichung (TW); Chien-Hsun Lai, Taichung (TW); Yao-Wei Liu, Taichung (TW)

(73) Assignee: Ability Opto-Electronics Technology Co., Ltd., Taichung (TW)

( * ) Notice: Subject to any disclaimer, the term of this patent is extended or adjusted under 35 U.S.C. 154(b) by 0 days.

(21) Appl. No.: 16/930,748

(22) Filed: Jul. 16, 2020

(65) Prior Publication Data

US 2021/0325637 A1 Oct. 21, 2021

(30) Foreign Application Priority Data

Apr. 20, 2020 (TW) .................................. 109113128

(51) Int. Cl.
*G02B 13/00* (2006.01)
*G02B 9/58* (2006.01)

(52) U.S. Cl.
CPC ............. *G02B 13/004* (2013.01); *G02B 9/58* (2013.01)

(58) Field of Classification Search
CPC ... G02B 9/34; G02B 9/36; G02B 9/38; G02B 9/44; G02B 9/50; G02B 9/56; G02B 9/58; G02B 13/004; G02B 13/06; G02B 9/60; G02B 9/62; G02B 13/0015; G02B 13/18; G02B 13/008; G02B 13/0035; G02B 13/00

See application file for complete search history.

(56) References Cited

U.S. PATENT DOCUMENTS

| 3,649,104 | A  | * | 3/1972 | Edwards | .................. G02B 9/34 |
|---|---|---|---|---|---|
|  |  |  |  |  | 359/779 |
| 2017/0017061 | A1 | * | 1/2017 | Liu | .......................... G02B 9/34 |
| 2019/0107689 | A1 | * | 4/2019 | Huang | .................. G02B 13/004 |
| 2020/0018930 | A1 | * | 1/2020 | Tseng | ................... G02B 13/004 |
| 2020/0301107 | A1 | * | 9/2020 | Lin | ........................... G02B 9/34 |
| 2021/0165188 | A1 | * | 6/2021 | Hsueh | ....................... G02B 9/34 |

FOREIGN PATENT DOCUMENTS

TW        I689746 B        4/2020

OTHER PUBLICATIONS

Office Action of corresponding TW application, published on Apr. 22, 2022.

* cited by examiner

*Primary Examiner* — Ephrem Z Mebrahtu
(74) *Attorney, Agent, or Firm* — Wang Law Firm, Inc.

(57) ABSTRACT

A four-piece optical image capturing system is disclosed. In order from an object side to an image side, the optical image capturing system along the optical axis includes a first lens with positive refractive power; a second lens with refractive power; a third lens with refractive power; and a fourth lens with refractive power; and at least one of the image-side surface and object-side surface of each of the four lenses are aspheric. The optical image capturing system can increase aperture value and improve the imagining quality for use in compact cameras.

22 Claims, 9 Drawing Sheets

OPTICAL IMAGE CAPTURING SYSTEM

CROSS-REFERENCE TO RELATED APPLICATION

This application claims priority from Taiwan Patent Application No. 109113128, filed on Apr. 20, 2020, in the Taiwan Intellectual Property Office, the content of which is hereby incorporated by reference in its entirety for all purposes.

BACKGROUND OF THE INVENTION

1. Field of the Invention

The present invention relates to an optical image capturing system, and more particularly to a compact optical image capturing system which can be applied to electronic products.

2. Description of the Related Art

In recent years, with the rise of portable electronic devices having camera functionalities, the demand for an optical image capturing system has gradually been raised. The image sensing device of the ordinary photographing camera is commonly selected from a charge coupled device (CCD) or a complementary metal-oxide semiconductor sensor (CMOS Sensor). Also, as advanced semiconductor manufacturing technology enables the minimization of the pixel size of the image sensing device, the development of the optical image capturing system has gravitated towards the field of high pixels. Therefore, the requirement for high image quality has been rapidly increasing.

The traditional optical image capturing system of a portable electronic device comes with different designs, including a two-lens or a three-lens design. However, the requirement for the higher pixels and the requirement for a large aperture of an end user, like functionalities of micro filming and night view, or the requirement of wide angle of view of the portable electronic device have been raised. But the optical image capturing system with the large aperture design often produces more aberration resulting in the deterioration of quality in peripheral image formation and difficulties of manufacturing, and the optical image capturing system with wide angle of view design increases distortion rate in image formation, thus the optical image capturing system in prior arts cannot meet the requirement of the higher order camera lens module.

Therefore, how to design an optical image capturing system capable of balancing the requirement for higher total pixel count and quality of the formed image as well as the minimization of camera module by effectively increasing the amount of admitted light and the angle of view the optical image capturing system has become a pressing issue.

SUMMARY OF THE INVENTION

The aspect of embodiment of the present invention directs to an optical image capturing system and an optical image capturing lens which use combination of refractive power, convex and concave surfaces of four-piece optical lenses (the convex or concave surface in the present invention denotes the change of geometrical shape of an object side or an image side of each lens with different height from an optical axis) to increase the quantity of incoming light of the optical image capturing system and the angle of view of the optical lenses, and to improve total pixels and image quality for image formation, so as to be applied to compact electronic products.

The term and the definition to the lens parameter in the embodiment of the present invention are shown as below for further reference.

The Lens Parameters Related to the Length or the Height

The maximum height for image formation of the optical image capturing system is denoted by HOI. The height of the optical image capturing system is denoted by HOS. The distance from the object side of the first lens to the image side of the fourth lens is denoted by InTL. The distance from the image side of the fourth lens to an image plane is denoted by InB, wherein InTL+InB=HOS. The distance from an aperture stop (aperture) to the image plane is denoted by InS. The distance from the first lens to the second lens is denoted by In12 (instance). The central thickness of the first lens of the optical image capturing system on the optical axis is denoted by TP1 (instance).

The Lens Parameters Related to the Material

The coefficient of dispersion of the first lens in the optical image capturing system is denoted by NA1 (instance). The refractive index of the first lens is denoted by Nd1 (instance).

The Lens Parameters Related to the Angle of View

The angle of view is denoted by AF. Half of the angle of view is denoted by HAF. The major light angle is denoted by MRA.

The Lens Parameters Related to the Exit/Entrance Pupil

The entrance pupil diameter of the optical image capturing system is denoted by HEP. A maximum effective half diameter (EHD) of any surface of the single lens is a perpendicular distance between an optical axis and an intersection point on the surface where the incident light with a maximum angle of view of the system passing the edge of the entrance pupil. For example, the maximum effective half diameter of the object side of the first lens may be expressed as EHD11. The maximum effective half diameter of the image side of the first lens may be expressed as EHD12. The maximum effective half diameter of the object side of the second lens may be expressed as EHD21. The maximum effective half diameter of the image side of the second lens may be expressed as EHD22. The maximum effective half diameters of any surfaces of other lenses in the optical image capturing system are expressed in a similar way.

The Lens Parameters Related to the Depth

The horizontal distance parallel to an optical axis from a maximum effective half diameter position of the object side of the fourth lens to an intersection point where the object side of the fourth lens crosses the optical axis is denoted by InRS41 (instance). The horizontal distance parallel to an optical axis from a maximum effective half diameter position the image side of the fourth lens to an intersection point where the object side of the fourth lens crosses the optical axis on the image side of the fourth lens is denoted by InRS42 (instance).

The Lens Parameter Related to the Shape of the Lens

The critical point C is a tangent point on a surface of a specific lens. The tangent point is tangent to a plane perpendicular to the optical axis except that an intersection point which crosses the optical axis on the specific surface of the lens. In accordance, the distance perpendicular to the optical axis between a critical point C31 on the object side of the third lens and the optical axis is HVT31 (instance). The distance perpendicular to the optical axis between a critical point C32 on the image side of the third lens and the optical axis is HVT32 (instance). The distance perpendicular to the optical axis between a critical point C41 on the object side of the fourth lens and the optical axis is HVT41 (instance). The distance perpendicular to the optical axis between a critical point C42 on the image side of the fourth lens and the optical axis is HVT42 (instance). The distances perpendicular to the optical axis between critical points on the object side or the image side of other lenses and the optical axis are denoted in a similar way as described above.

The object side of the fourth lens has one inflection point IF411 which is the first nearest to the optical axis. The sinkage value of the inflection point IF411 is denoted by SGI411. SGI411 is a horizontal distance parallel to the optical axis, which is from an intersection point where the object side of the fourth lens crosses the optical axis to the inflection point on the object side of the fourth lens that is the first nearest to the optical axis. The distance perpendicular to the optical axis between the inflection point IF411 and the optical axis is HIF411 (instance). The image side of the fourth lens has one inflection point IF421 which is the first nearest to the optical axis and the sinkage value of the inflection point IF421 is denoted by SGI421 (instance). SGI421 is a horizontal distance parallel to the optical axis, which is from the intersection point where the image side of the fourth lens crosses the optical axis to the inflection point on the image side of the fourth lens that is the first nearest to the optical axis. The distance perpendicular to the optical axis between the inflection point IF421 and the optical axis is HIF421 (instance).

The object side of the fourth lens has one inflection point IF412 which is the second nearest to the optical axis and the sinkage value of the inflection point IF412 is denoted by SGI412 (instance). SGI412 is a horizontal distance parallel to the optical axis, which is from an intersection point where the object side of the fourth lens crosses the optical axis to the inflection point on the object side of the fourth lens that is the second nearest to the optical axis. The distance perpendicular to the optical axis between the inflection point IF412 and the optical axis is HIF412 (instance). The image side of the fourth lens has one inflection point IF422 which is the second nearest to the optical axis and the sinkage value of the inflection point IF422 is denoted by SGI422 (instance). SGI422 is a horizontal distance parallel to the optical axis, which is from an intersection point where the image side of the fourth lens crosses the optical axis to the inflection point on the image side of the fourth lens that is the second nearest to the optical axis. The distance perpendicular to the optical axis between the inflection point IF422 and the optical axis is HIF422 (instance).

The object side of the fourth lens has one inflection point IF413 which is the third nearest to the optical axis and the sinkage value of the inflection point IF413 is denoted by SGI413 (instance). SGI413 is a horizontal distance parallel to the optical axis, which is from an intersection point where the object side of the fourth lens crosses the optical axis to the inflection point on the object side of the fourth lens that is the third nearest to the optical axis. A distance perpendicular to the optical axis between the inflection point IF413 and the optical axis is HIF413 (instance). The image side of the fourth lens has one inflection point IF423 which is the third nearest to the optical axis and the sinkage value of the inflection point IF423 is denoted by SGI423 (instance). SGI423 is a horizontal distance parallel to the optical axis, which is from an intersection point where the image side of the fourth lens crosses the optical axis to the inflection point on the image side of the fourth lens that is the third nearest to the optical axis. The distance perpendicular to the optical axis between the inflection point IF423 and the optical axis is HIF423 (instance).

The object side of the fourth lens has one inflection point IF414 which is the fourth nearest to the optical axis and the sinkage value of the inflection point IF414 is denoted by SGI414 (instance). SGI414 is a horizontal distance parallel to the optical axis, which is from an intersection point where the object side of the fourth lens crosses the optical axis to the inflection point on the object side of the fourth lens that is the fourth nearest to the optical axis. The distance perpendicular to the optical axis between the inflection point IF414 and the optical axis is HIF414 (instance). The image side of the fourth lens has one inflection point IF424 which is the fourth nearest to the optical axis and the sinkage value of the inflection point IF424 is denoted by SGI424 (instance). SGI424 is a horizontal distance parallel to the optical axis, which is from an intersection point where the image side of the fourth lens crosses the optical axis to the inflection point on the image side of the fourth lens that is the fourth nearest to the optical axis. The distance perpendicular to the optical axis between the inflection point IF424 and the optical axis is HIF424 (instance).

The inflection points on the object sides or the image side of the other lenses and the distances perpendicular to the optical axis thereof or the sinkage values thereof are denoted in a similar way described above.

The Lens Parameters Related to the Aberration

Optical distortion for image formation in the optical image capturing system is denoted by ODT. TV distortion for image formation in the optical image capturing system is denoted by TDT. Further, the degree of aberration offset within a range of 50% to 100% of the field of view of the image can be further limited. An offset of the spherical aberration is denoted by DFS. An offset of the coma aberration is denoted by DFC.

The characteristic diagram of modulation transfer function (MTF) of the optical image capturing system is used for testing and evaluating the contrast ratio and the sharpness ratio of the image. The vertical coordinate axis of the characteristic diagram of modulation transfer function indicates a contrast transfer rate (with values from 0 to 1). The horizontal coordinate axis indicates a spatial frequency (cycles/mm; lp/mm; line pairs per mm). Theoretically, an ideal image capturing system can clearly and distinctly show the line contrast of a photographed object. However, the values of the contrast transfer rate at the vertical coordinate axis are smaller than 1 in the actual optical image capturing system. In addition, to achieve a fine degree of recovery in the edge region of the image is generally more difficult than in the central region of the image. The contrast transfer rates (MTF values) with spatial frequencies of 55 cycles/mm at the optical axis, 0.3 field of view and 0.7 field of view of visible light spectrum on the image plane may be expressed respectively as MTFE0, MTFE3 and MTFE7. The contrast transfer rates (MTF values) with spatial frequencies of 110 cycles/mm at the optical axis, 0.3 field of view, and 0.7 field of view of visible light spectrum on the image plane may be respectively expressed as MTFQ0, MTFQ3 and MTFQ7. The contrast transfer rates (MTF values) with spatial frequencies of 220 cycles/mm at the optical axis, 0.3 field of view, and 0.7 field of view of visible light spectrum on the image plane may be respectively expressed as MTFH0, MTFH3 and MTFH7. The contrast transfer rates (MTF values) with spatial frequencies of 440 cycles/mm at the optical axis, 0.3 field of view, and 0.7 field of view of visible light spectrum on the image plane may be respectively expressed as MTF0, MTF3 and MTF7. The three fields of view described above are representative to the center, the internal field of view and the external field of view of the lens. Therefore, the three fields of view described above may be used to evaluate whether the performance of the specific optical image capturing system is excellent. If the design of the optical image capturing system corresponds to a sensing device which pixel size is below and equal to 1.12 micrometers, the quarter spatial frequencies, the half spatial frequencies (half frequencies) and the full spatial frequencies (full frequencies) of the characteristic diagram of modulation transfer function are respectively at least 110 cycles/mm, 220 cycles/mm and 440 cycles/mm.

If an optical image capturing system needs to satisfy conditions with images of the infrared spectrum and the visible spectrum simultaneously, such as the requirements for night vision in low light, the used wavelength may be 850 nm or 800 nm. Since the main function is to recognize the shape of an object formed in a black-and-white environment, high resolution is unnecessary and thus the spatial frequency which is less than 110 cycles/mm may be selected to evaluate the performance of the specific optical image capturing system on the infrared light spectrum. When the operation wavelength 850 nm is focused on the image plane, the contrast transfer rates (MTF values) with a spatial frequency of 55 cycles/mm where the images are at the optical axis, 0.3 field of view and 0.7 field of view may be respectively expressed as MTFI0, MTFI3 and MTFI7. However, because the difference between the infrared wavelength of 850 nm or 800 nm and the general visible light wavelength is large, the optical image capturing system which not only has to focus on the visible light and the infrared light (dual-mode) but also has to achieve a certain function in the visible light and the infrared light respectively has a significant difficulty in design.

The present invention provides an optical image capturing system, which is able to focus on the visible light and the infrared light (dual-mode) simultaneously while achieve a certain function respectively, and an object-side surface or an image-side surface of the fourth lens has inflection points, such that the angle of incidence from each field of view to the fourth lens can be adjusted effectively and the optical distortion and the TV distortion can be corrected as well. Besides, the surfaces of the fourth lens may have a better optical path adjusting ability to acquire better imaging quality.

The present invention provides an optical image capturing system, from an object side to an image side, comprising a first lens, a second lens, a third lens, a fourth lens, and an image plane. The first lens has refractive power, focal lengths of the first lens through the fourth lens are f1, f2, f3, and f4, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the fourth lens is denoted by InTL, a half maximum angle of view of the optical image capturing system is denoted by HAF, thicknesses of the first lens to the fourth lens at height of ½ HEP parallel to the optical axis are respectively denoted by ETP1, ETP2, ETP3, and ETP4, a sum of ETP1 to ETP4 described above is denoted by SETP, thicknesses of the first lens to the fourth lens on the optical axis are respectively denoted by TP1, TP2, TP3, and TP4, a sum of TP1 to TP4 described above is denoted by STP, and the following conditions are satisfied: $1 \leq f/HEP \leq 10.0$; $0 \deg < HAF \leq 50 \deg$; and $0.5 \leq SETP/STP < 1$.

The present invention provides an optical image capturing system, from an object side to an image side, comprising a first lens with refractive power, a second lens with refractive power, a third lens with refractive power, a fourth lens with refractive power, and an image plane. At least one surface of at least two lens among the four lenses has at least one inflection point, at least one lens among the second lens, the third lens and the fourth lens has positive refractive power, focal lengths of the first lens through the fourth lens are f1, f2, f3, and f4, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the fourth lens is denoted by InTL, a half maximum angle of view of the optical image capturing system is denoted by HAF, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the fourth lens at height of ½ HEP is denoted by EIN, and the following conditions are satisfied: $1.0 \leq f/HEP \leq 10.0$; $0 \deg < HAF \leq 150 \deg$; and $0.2 \leq EIN/ETL < 1$.

The present invention provides an optical image capturing system, from an object side to an image side, comprising a first lens with negative refractive power, a second lens with refractive power, a third lens with refractive power, a fourth lens with refractive power, and an image plane. At least one of object and image sides of the fourth lens has at least one inflection point, at least one lens among the second lens, the third lens and the fourth lens has positive refractive power, focal lengths of the first lens through the fourth lens are f1, f2, f3, and f4, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the fourth lens is denoted by InTL, a half maximum angle of view of the optical image capturing system is denoted by HAF, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the fourth lens at height of ½ HEP is denoted by EIN, and the following conditions are satisfied: $1.0 \leq f/HEP \leq 10.0$; $0 \deg < HAF \leq 100 \deg$; and $0.2 \leq EIN/ETL < 1$.

A thickness of a single lens at height of ½ entrance pupil diameter (HEP) particularly affects the corrected aberration of common area of each field of view of light and the capability of correcting optical path difference between each field of view of light in the scope of ½ entrance pupil diameter (HEP). The capability of aberration correction is enhanced if the thickness becomes greater, but the difficulty for manufacturing is also increased at the same time. Therefore, it is necessary to control the thickness of a single lens at height of ½ entrance pupil diameter (HEP), in particular to control the ratio relation (ETP/TP) of the thickness (ETP) of the lens at height of ½ entrance pupil diameter (HEP) to the thickness (TP) of the lens to which the surface belongs on the optical axis. For example, the thickness of the first lens at height of ½ entrance pupil diameter (HEP) is denoted by ETP1. The thickness of the second lens at height of ½ entrance pupil diameter (HEP) is denoted by ETP2. The thicknesses of other lens are denoted in the similar way. A sum of ETP1 to ETP4 described above is SETP. The embodiments of the present invention may satisfy the following relation: 0.3≤SETP/EIN<1.

In order to achieve a balance between enhancing the capability of aberration correction and reducing the difficulty for manufacturing, the ratio relationship (ETP/TP) between the thickness (ETP) of the lens at the height of ½ entrance pupil diameter (HEP) and the thickness (TP) of the lens on the optical axis needs to be controlled in particular. For example, the thickness of the first lens at the height of ½ entrance pupil diameter (HEP) may be expressed as ETP1. The thickness of the first lens on the optical axis may be expressed as TP1. The ratio between ETP1 and TP1 may be expressed as ETP1/TP1. The thickness of the second lens at the height of ½ entrance pupil diameter (HEP) may be expressed as ETP2. The thickness of the second lens on the optical axis may be expressed as TP2. The ratio between ETP2 and TP2 may be expressed as ETP2/TP2. The ratio relationships between the thicknesses of other lenses at height of ½ entrance pupil diameter (HEP) and the thicknesses (TP) of the lens on the optical axis lens in the optical image capturing system are expressed in a similar way. The embodiments of the present invention may satisfy the following relationship: 0<ETP/TP≤5.

The horizontal distance between two adjacent lenses at height of ½ entrance pupil diameter (HEP) may be expressed as ED. The horizontal distance (ED) described above is parallel to the optical axis of the optical image capturing system and particularly affects the corrected aberration of common area of each field of view of light and the capability of correcting the optical path difference between each field of view of light at the position of ½ entrance pupil diameter (HEP). The capability of aberration correction may be enhanced if the horizontal distance becomes greater, but the difficulty for manufacturing is also increased and the degree of 'miniaturization' to the length of the optical image capturing system is restricted. Therefore, the horizontal distance (ED) between two specific adjacent lens at the height of ½ entrance pupil diameter (HEP) must be controlled.

In order to achieve a balance between enhancing the capability of correcting aberration and reducing the difficulty for 'minimization' to the length of the optical image capturing system, the ratio relationship (ED/IN) of the horizontal distance (ED) between the two adjacent lenses at height of ½ entrance pupil diameter (HEP) to the horizontal distance (IN) between the two adjacent lenses on the optical axis particularly needs to be controlled. For example, the horizontal distance between the first lens and the second lens at height of ½ entrance pupil diameter (HEP) may be expressed as ED12. The horizontal distance on the optical axis between the first lens and the second lens may be expressed as IN12. The ratio between ED12 and IN12 may be expressed as ED12/IN12. The horizontal distance between the second lens and the third lens at height of ½ entrance pupil diameter (HEP) may be expressed as ED23. The horizontal distance on the optical axis between the second lens and the third lens may be expressed as IN23. The ratio between ED23 and IN23 may be expressed as ED23/IN23. The ratio relationships of the horizontal distances between other two adjacent lenses in the optical image capturing system at height of ½ entrance pupil diameter (HEP) to the horizontal distances on the optical axis between the two adjacent lenses are expressed in a similar way.

The horizontal distance parallel to the optical axis from a coordinate point on the image side of the fourth lens at height ½ HEP to the image plane may be expressed as EBL. The horizontal distance parallel to the optical axis from an intersection point where the image side of the fourth lens crosses the optical axis to the image plane may be expressed as BL. The embodiments of the present invention are able to achieve a balance between enhancing the capability of aberration correction and reserving space to accommodate other optical lenses and the following condition may be satisfied: 0.1≤EBL/BL≤1.5.

The optical image capturing system may further include a light filtering element. The light filtering is located between the fourth lens and the image plane. The distance parallel to the optical axis from a coordinate point on the image side of the fourth lens at height of ½ HEP to the light filtering may be expressed as EIR. The distance parallel to the optical axis from an intersection point where the image side of the fourth lens crosses the optical axis to the light filtering may be expressed as PIR. The embodiments of the present invention may satisfy the following condition: 0.1≤EIR/PIR≤1.1.

The optical image capturing system described above may be configured to form the image on the image sensing device which is shorter than 1/1.2 inch in diagonal length; preferably, the size of the image sensing device is 1/2.3 inch. The pixel size of the image sensing device is smaller than 1.4 micrometers (μm). Preferably, the pixel size thereof is smaller than 1.12 micrometers (μm), and the best pixel size thereof is smaller than 0.9 micrometers (μm). Furthermore, the optical image capturing system is applicable to the image sensing device with aspect ratio of 16:9.

The optical image capturing system described above is applicable to the demand of video recording with above millions or ten millions-pixels (e.g. 4K2K or the so-called UHD and QHD) and leads to a good imaging quality.

The height of optical system (HOS) may be reduced to achieve the minimization of the optical image capturing system when the absolute value of f1 is larger than f4 (|f1|>|f4|).

When |f2|+|f3|>|f1|+|f4|, at least one lens among the second lens to the third lens may have a weak positive refractive power or a weak negative refractive power. The weak refractive power indicates that an absolute value of the focal length of a specific lens is greater than 10. When at least one lens among the second lens to the third lens has the weak positive refractive power, the positive refractive power of the first lens can be shared by this configuration, such that the unnecessary aberration will not appear too early. On the contrary, when at least one lens among the second lens to the third lens has the weak negative refractive power, the aberration of the optical image capturing system can be slightly corrected.

Besides, the fourth lens may have negative refractive power, and the image side thereof may be a concave surface. Hereby, this configuration is beneficial to shorten the back focal length of the optical image capturing system so as to keep the optical image capturing system minimized. Moreover, at least one surface of the fourth lens may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present invention will now be described in more details hereinafter with reference to the accompanying drawings that show various embodiments of the present invention as follows.

DESCRIPTION OF THE PREFERRED EMBODIMENTS

Figure 1A:
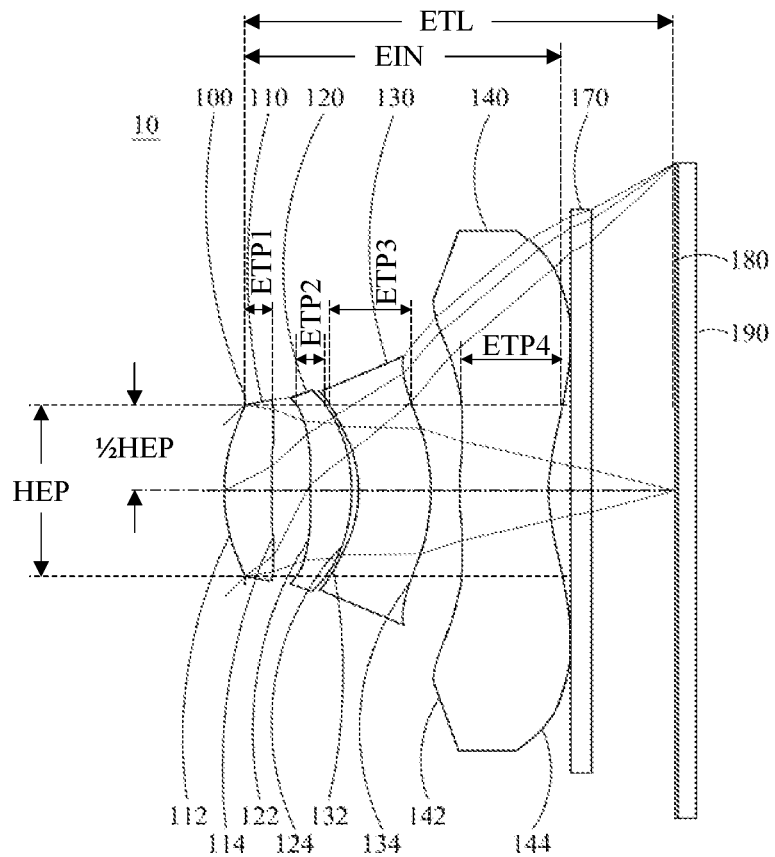
FIG. 1A is a schematic view of the optical image capturing system according to the first embodiment of the present invention.

The advantages, features, and technical methods of the present invention are to be explained in detail with reference to the exemplary embodiments and the figures for the purpose of being more easily to be understood. Moreover, the present invention may be realized in different forms, and should not be construed as being limited to the embodiments set forth herein. Conversely, for a person skilled in the art, the embodiments provided shall make the present invention convey the scope more thoroughly, comprehensively, and completely. In addition, the present invention shall be defined only by the appended claims.

An optical image capturing system is provided, which includes, in the order from the object side to the image side, a first lens, a second lens, a third lens, and a fourth lens. The optical image capturing system may further include an image sensing device, which is disposed on the image plane.

The optical image capturing system may use three sets of wavelengths which are respectively 486.1 nm, 587.5 nm and 656.2 nm, wherein 587.5 nm is served as the primary reference wavelength and a reference wavelength for retrieving technical features. The optical image capturing system may also use five sets of wavelengths which are respectively 470 nm, 510 nm, 555 nm, 610 nm and 650 nm, wherein 555 nm is served as the primary reference wavelength and a reference wavelength for retrieving technical features.

The ratio of the focal length f of the optical image capturing system to a focal length fp of each of lenses with positive refractive power is denoted by PPR. The ratio of the focal length f of the optical image capturing system to a focal length fn of each of lenses with negative refractive power is denoted by NPR. The sum of the PPR of all lenses with positive refractive power is ΣPPR. The sum of the NPR of all lenses with negative refractive power is ΣNPR. The control of the total refractive power and the total length of the optical image capturing system is favorable when following condition is satisfied: 0.5≤ΣPPR/|ΣNPR|≤4.5. Preferably, the following condition is satisfied: 1≤ΣPPR/|ΣNPR|≤3.5.

The height of the optical image capturing system is HOS. It will facilitate the manufacturing of miniaturized optical image capturing system which may form images with ultra high pixels when the specific ratio value of HOS/f tends to 1.

In the optical image capturing system of the first embodiment, the sum of focal lengths of all lenses with positive refractive power is denoted by ΣPP. the sum of focal lengths of all lenses with negative refractive power is denoted by ΣNP. The following conditions are satisfied: 0<ΣPP≤200; and f1/ΣEPP≤0.85. Preferably, the following conditions are satisfied: 0<ΣPP≤150; and 0.01≤f1/ΣPP≤0.7. Hereby, this configuration is helpful to control focus ability of the optical image capturing system, and distribute the positive refractive power of a single lens to other lens with positive refractive powers in an appropriate way, such that the unnecessary aberration will not appear too early.

The first lens has positive refractive power and the object side of the first lens is a convex surface. Hereby, the positive refractive power of the first lens can be adjusted properly and the total height of the optical image capturing system can be reduced.

The second lens has negative refractive power. Hereby, the aberration of the first lens can be corrected.

The third lens has positive refractive power. Hereby, the positive refractive power of the first lens can be shared by this configuration.

The fourth lens has negative refractive power and the image side of the fourth lens is a concave surface. Hereby, this configuration is beneficial to shorten the back focal length of the optical image capturing system so as to keep the optical image capturing system minimized. Moreover, at least one surface of the fourth lens may possess at least one inflection point, which is capable of effectively reducing the incident angle of the off-axis rays, thereby further correcting the off-axis aberration. Preferably, each of image side and object side of the fourth lens possess at least one inflection point.

The optical image capturing system may further include an image sensing device which is disposed on an image plane. A half of a diagonal of an effective detection field of the image sensing device (imaging height or the maximum image height of the optical image capturing system) is HOI. The distance on the optical axis from the object side of the first lens to the image plane is HOS. The following conditions are satisfied: HOS/HOI≤3 and 0.5≤HOS/f≤3.0. Preferably, the following conditions is satisfied: 1≤HOS/HOI≤2.5 and 1≤HOS/f≤2. Hereby, the miniaturization of the optical image capturing system can be maintained effectively, so as to be carried by lightweight portable electronic devices.

In addition, in the optical image capturing system of the present invention, according to different requirements, at least one aperture may be arranged for reducing stray light and improving the image quality.

Specifically, the disposition of the aperture may be a front aperture or a middle aperture in the optical image capturing module in the present invention. The front aperture is the aperture disposed between the shot object and the first lens. The middle aperture is the aperture disposed between the first lens and the image plane. If the aperture is the front aperture, a longer distance may be created between the exit pupil and the image plane in the optical image capturing module, so that more optical elements may be accommodated and the efficiency of image sensor elements receiving images may be increased. If the aperture is the middle aperture, the field of view of the system may be expended in such a way that the optical image capturing module has the advantages of a wide-angle lens. InS is defined as the distance from the aforementioned aperture to the image plane, which satisfies the following condition: 0.5≤InS/HOS≤1.1. Preferably, the following condition is satisfied: 0.8≤InS/HOS≤1. Therefore, the features of the optical image capturing module maintained in miniaturization and having wide-angle may be attended simultaneously.

In the optical image capturing system of the present invention, the distance from the object side of the first lens to the image side of the fourth lens is InTL. A total central thickness of all lenses with refractive power on the optical axis is ΣTP. The following condition is satisfied: 0.45≤ΣTP/InTL≤0.95. Preferably, the following condition is satisfied: 0.6≤ΣTP/InTL≤0.9. Hereby, the contrast ratio for the image formation in the optical image capturing system and yield rate for manufacturing the lens can be given consideration simultaneously, and a proper back focal length is provided to dispose other optical components in the optical image capturing system.

The curvature radius of the object side of the first lens is R1. The curvature radius of the image side of the first lens is R2. The following condition is satisfied: 0.01≤|R1/R2|≤0.5. Hereby, the first lens may have proper strength of the positive refractive power, so as to avoid the longitudinal spherical aberration from increasing too fast. Preferably, the following condition may be satisfied: 0.01≤|R1/R2|<0.4.

The curvature radius of the object side of the fourth lens is R7. The curvature radius of the image side of the fourth lens is R8. The following condition is satisfied: −200<(R7−R8)/(R7+R8)<30. Hereby, the astigmatism generated by the optical image capturing system can be corrected beneficially.

The distance between the first lens and the second lens on the optical axis is IN12. The following condition is satisfied: 0<IN12/f≤0.25. Preferably, the following condition may be satisfied: 0.01≤IN12/f≤0.20. Hereby, the chromatic aberration of the lenses can be improved, such that the performance can be increased.

IN23 is the distance between the second lens and the third lens on the optical axis. The following condition is satisfied: 0<IN23/f≤0.25. Preferably, the following condition may be satisfied: 0.01≤IN23/f≤0.20. Hereby, the performance of the lenses can be improved.

IN34 is the distance between the third lens and the fourth lens on the optical axis. The following condition is satisfied: 0<IN34/f≤0.25. Preferably, the following condition may be satisfied: 0.001≤IN34/f≤0.20. Hereby, the performance of the lenses can be improved.

Central thicknesses of the first lens and the second lens on the optical axis are respectively denoted by TP1 and TP2. The following condition is satisfied: 1≤(TP1+IN12)/TP2≤10. Hereby, the sensitivity produced by the optical image capturing system can be controlled, and the performance can be increased.

Central thicknesses of the third lens and the fourth lens on the optical axis are respectively denoted by TP3 and TP4. IN34 is the distance between the third lens and the fourth lens on the optical axis. The following condition is satisfied: 0.2≤(TP4+IN34)/TP4≤3. Hereby, the sensitivity produced by the optical image capturing system can be controlled and the total height of the optical image capturing system can be reduced.

IN23 is the distance between the second lens and the third lens on the optical axis. A total central thickness of all lenses with refractive power on the optical axis is ΣTP. The following condition is satisfied: 0.01≤IN23/(TP2+IN23+TP3)≤0.5. Preferably, the following condition may be satisfied: 0.05≤IN23/(TP2+IN23+TP3)≤0.4. Hereby, this configuration is helpful to slightly correct the aberration of the propagating process of the incident light layer by layer, and decrease the total height of the optical image capturing system.

In the optical image capturing system of the first embodiment, a horizontal distance parallel to the optical axis from an intersection point where the object side of the fourth lens crosses the optical axis to a maximum effective half diameter position on the object side of the fourth lens is denoted by InRS41. When the horizontal distance is towards the image side, InRS41 is positive, and when horizontal distance is towards the object side, InRS41 is negative. The horizontal distance parallel to the optical axis from an intersection point where the image side of the fourth lens crosses the optical axis to a maximum effective half diameter position on the image side of the fourth lens is denoted by InRS42. The thickness of the fourth lens on the optical axis is denoted by TP4. The following conditions are satisfied: $-1$ mm$\leq$InRS41$\leq$1 mm; $-1$ mm$\leq$InRS42$\leq$1 mm; 1 mm$\leq$|InRS41|+|InRS42|$\leq$2 mm; 0.01$\leq$|InRS41|/TP4$\leq$10; and 0.01$\leq$|InRS42|/TP4$\leq$10. Hereby, the maximum effective half diameter positions on the image side and the object side of the fourth lens cane be controlled, the aberration at surrounding field of view for the optical image capturing system can be corrected beneficially, and the miniaturization of the optical image capturing system can be maintained effectively.

The horizontal distance parallel to the optical axis from an inflection point on the object side of the fourth lens that is the first nearest to the optical axis to the intersection point where the object side of the fourth lens crosses the optical axis is denoted by SGI411. The horizontal distance parallel to the optical axis from an inflection point on the image side of the fourth lens that is the first nearest to the optical axis to the intersection point where the image side of the fourth lens crosses the optical axis is denoted by SGI421. The following conditions are satisfied: 0<SGI411/(SGI411+TP4)$\leq$0.9; and 0<SGI421/(SGI421+TP4)$\leq$0.9. Preferably, the following conditions are satisfied: 0.01<SGI411/(SGI411+TP4)$\leq$0.7; and 0.01<SGI421/(SGI421+TP4)$\leq$0.7.

The horizontal distance parallel to the optical axis from an inflection point on the object side of the fourth lens that is the second nearest to the optical axis to the intersection point where the object side of the fourth lens crosses the optical axis is denoted by SGI412. The horizontal distance parallel to the optical axis from an inflection point on the image side of the fourth lens that is the second nearest to the optical axis to the intersection point where the image side of the fourth lens crosses the optical axis is denoted by SGI422. The following conditions are satisfied: 0<SGI412/(SGI412+TP4)$\leq$0.9; and 0<SGI422/(SGI422+TP4)$\leq$0.9. Preferably, the following conditions are satisfied: 0.1$\leq$SGI412/(SGI412+TP4)$\leq$0.8; and 0.1$\leq$SGI422/(SGI422+TP4)$\leq$0.8.

The perpendicular distance between the inflection point on the object side of the fourth lens that is the first nearest to the optical axis and the optical axis is denoted by HIF411. The distance perpendicular to the optical axis between the inflection point on the image side of the fourth lens that is the first nearest to the optical axis and the intersection point where the image side of the fourth lens crosses the optical axis is denoted by HIF421. The following conditions are satisfied: 0.01$\leq$HIF411/HOI$\leq$0.9; and 0.01$\leq$HIF421/HOI$\leq$0.9. Preferably, the following conditions are satisfied: 0.09$\leq$HIF411/HOI$\leq$0.5; and 0.09$\leq$HIF421/HOI$\leq$0.5.

The perpendicular distance between the inflection point on the object side of the fourth lens that is the second nearest to the optical axis and the optical axis is denoted by HIF412. The distance perpendicular to the optical axis between the inflection point on the image side of the fourth lens that is the second nearest to the optical axis and the intersection point where the image side of the fourth lens crosses the optical axis is denoted by HIF422. The following conditions are satisfied: 0.01$\leq$HIF412/HOI$\leq$0.9; and 0.01$\leq$HIF422/HOI$\leq$0.9. Preferably, the following conditions are satisfied: 0.09$\leq$HIF412/HOI$\leq$0.8; and 0.09$\leq$HIF422/HOI$\leq$0.8.

The perpendicular distance between the inflection point on the object side of the fourth lens that is the third nearest to the optical axis and the optical axis is denoted by HIF413. The distance perpendicular to the optical axis between the inflection point on the image side of the fourth lens that is the third nearest to the optical axis and the intersection point where the image side of the fourth lens crosses the optical axis is denoted by HIF423. The following conditions are satisfied: 0.001 mm$\leq$|HIF413|$\leq$5 mm; and 0.001$\leq$|HIF423|$\leq$5 mm. Preferably, the following conditions are satisfied: 0.1 mm$\leq$|HIF423|$\leq$3.5 mm; and 0.1 mm$\leq$|HIF413|$\leq$3.5 mm.

The perpendicular distance between the inflection point on the object side of the fourth lens that is the fourth nearest to the optical axis and the optical axis is denoted by HIF414. The distance perpendicular to the optical axis between the inflection point on the image side of the fourth lens that is the fourth nearest to the optical axis and the intersection point where the image side of the fourth lens crosses the optical axis is denoted by HIF424. The following conditions are satisfied: 0.001 mm$\leq$|HIF414|$\leq$5 mm; and 0.001$\leq$|HIF424|$\leq$5 mm. Preferably, the following conditions are satisfied: 0.1 mm$\leq$|HIF424|$\leq$3.5 mm; and 0.1 mm$\leq$|HIF414|$\leq$3.5 mm.

In one embodiment of the optical image capturing system of the present invention, the chromatic aberration of the optical image capturing system can be corrected by alternatively arranging the lenses with large coefficient of dispersion and small coefficient of dispersion.

The equation for the aspheric surface as mentioned above is:

$$z=ch^2/[1+[1(k+1)c^2h^2]^{0.5}]+A4h^4+A6h^6+A8h^8+A10h^{10}+A12h^{12}+A14h^{14}+A16h^{16}+A18h^{18}+A20h^{20}+ \quad (1)$$

wherein z is the position value of the position along the optical axis at the height h where the surface apex is regarded as a reference; k is the conic coefficient; c is the reciprocal of curvature radius; and A4, A6, A8, A10, A12, A14, A16, A18, and A20 are high order aspheric coefficients.

In the optical image capturing module provided by the present disclosure, the material of the lens may be made of glass or plastic. Using plastic as the material for producing the lens may effectively reduce the cost of manufacturing. In addition, using glass as the material for producing the lens may control the heat effect and increase the designed space configured by the refractive power of the optical image capturing module. Moreover, the object side surface and the image side surface from the first lens to the fourth lens may be aspheric, which may obtain more control variables. Apart from eliminating the aberration, the number of lenses used may be reduced compared with that of traditional lenses used made by glass. Thus, the total height of the optical image capturing module may be reduced effectively.

Furthermore, in the optical image capturing system provided by the present invention, when the surface of the lens is a convex surface, the surface of the lens adjacent to the optical axis is convex in principle. When the surface of the lens is a concave surface, the surface of the lens adjacent to the optical axis is concave in principle.

In addition, in the optical image capturing system of the present invention, according to different requirements, at least one aperture may be arranged for reducing stray light and improving the image quality.

The optical image capturing system of the present invention can be applied to the optical image capturing system with automatic focus based on the demand and has the characteristics of good aberration correction and good image quality. Thereby, the optical image capturing system expands the application aspect.

The optical image capturing system of the present invention can further include a driving module based on the demand. The driving module may be coupled with the lens and enable the movement of the lens. The foregoing driving module may be the voice coil motor (VCM) which is applied to move the lens to focus, or may be the optical image stabilization (OIS) which is applied to reduce the frequency which lead to the out focus due to the vibration of the camera lens in the shooting process.

At least one of the first lens, the second lens, the third lens, and the fourth lens of the optical image capturing system of the present invention may further be designed as a light filtering element with a wavelength of less than 500 nm based on the demand. The light filtering element may be made by coating film on at least one surface of that lens with certain filtering function, or forming that lens with material that can filter light with short wavelength.

The image plane of the optical image capturing system of the present invention may be a plane or a curved surface based on the design requirements. When the image plane is a curved surface (e.g. a spherical surface with curvature radius), the decrease of the required incident angle to focus rays on the image plane is helpful. In addition to the aid of the miniaturization of the length of the optical image capturing system (TTL), this configuration is helpful to elevate the relative illumination at the same time.

According to the above embodiments, the specific embodiments with figures are presented in detail as below.

First Embodiment

Figure 1B:
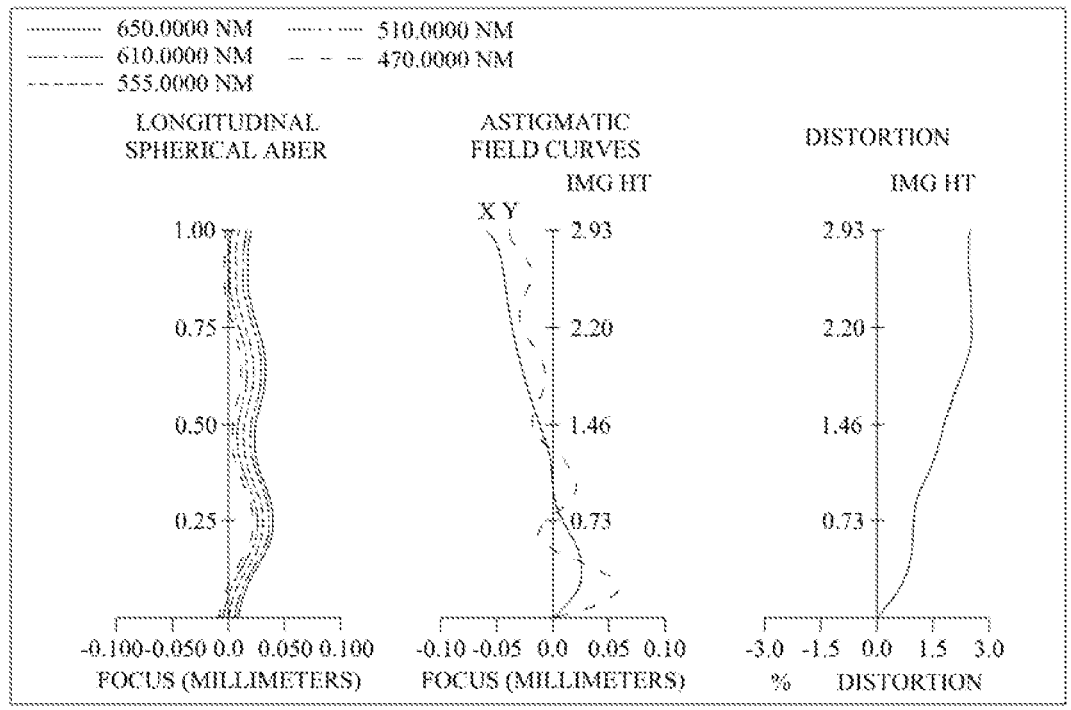
FIG. 1B is a curve diagram illustrating the spherical aberration, astigmatism and optical distortion of the optical image capturing system in order from left to right according to the first embodiment of the present invention.
Figure 1C:
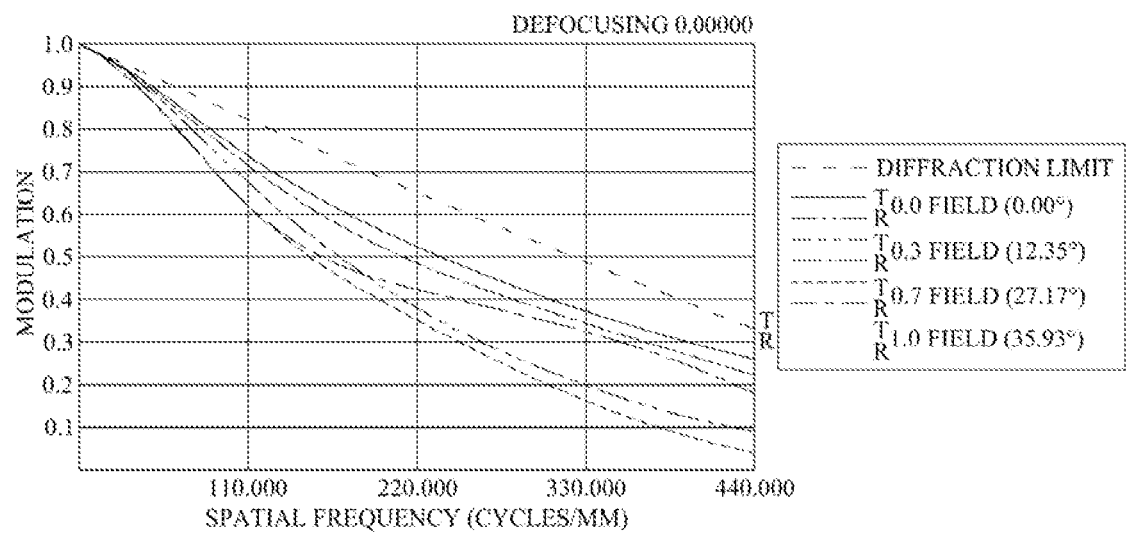
FIG. 1C is a characteristic diagram of modulation transfer of visible light spectrum for the optical image capturing system according to the first embodiment of the present invention.

Please refer to FIGS. 1A to 1C. FIG. 1A is a schematic view of the optical image capturing system according to the first embodiment of the present invention. FIG. 1B is a curve diagram illustrating the spherical aberration, astigmatism and optical distortion of the optical image capturing system in order from left to right according to the first embodiment of the present invention. FIG. 1C is a characteristic diagram of modulation transfer of visible light spectrum for the optical image capturing system according to the first embodiment of the present invention. As shown in FIG. 1A, an optical image capturing system includes, in the order from the object side to the image side, an aperture 100, a first lens 110, a second lens 120, a third lens 130, a fourth lens 140, an IR-cut filter 170, an image plane 180, and an image sensor element 190.

The first lens has positive refractive power and is made of plastic. The object side 112 of the first lens is a convex surface and the image side 114 of the first lens is a concave surface, and the object side 112 and the image side 114 are aspheric. The object side 112 has one inflection point, and the image side 114 has one inflection point. The thickness of the first lens on the optical axis is TP1. The thickness of the first lens at a height of ½ entrance pupil diameter (HEP) is denoted by ETP1.

SGI111 denotes a distance parallel to the optical axis from the inflection point on the object side surface of the first lens which is the nearest to the optical axis to an axial point on the object side surface of the first lens. SGI121 denotes a distance parallel to an optical axis from an inflection point on the image side surface of the first lens which is the nearest to the optical axis to an axial point on the image side surface of the first lens. The following conditions are satisfied: SGI111=0.2008 mm; SGI121=0.0113 mm; |SGI111|/(|SGI111|+TP1)=0.3018; and |SGI121|/(|SGI121|+TP1)=0.0238.

HIF111 denotes the distance perpendicular to the optical axis between the inflection point on the object side surface of the first lens which is the nearest to the optical axis and the optical axis. HIF121 denotes the distance perpendicular to the optical axis between an axial point on the image side surface of the first lens and an inflection point on the image side surface of the first lens which is the nearest to the optical axis. The following conditions are satisfied: HIF111=0.7488 mm; HIF121=0.4451 mm; HIF111/HOI=0.2552; and HIF121/HOI=0.1517.

The second lens has positive refractive power and is made of plastic. The object side 122 of the second lens is a concave surface and the image side 124 of the second lens is a convex surface, and the object side 122 and the image side 124 are aspheric. The object side 122 has one inflection point. The object side surface thereof has an inflection point. The thickness of the second lens on the optical axis is TP2. The thickness of the second lens at the height of ½ entrance pupil diameter (HEP) is denoted by ETP2.

The horizontal distance parallel to the optical axis from an inflection point on the object side of the second lens that is the first nearest to the optical axis to the intersection point where the object side of the second lens crosses the optical axis is denoted by SGI211. The horizontal distance parallel to the optical axis from an inflection point on the image side of the second lens that is the first nearest to the optical axis to the intersection point where the image side of the second lens crosses the optical axis is denoted by SGI221. The following conditions are satisfied: SGI211=−0.1791 mm; |SGI211|/(|SGI211|+TP2)=0.3109.

The perpendicular distance from the inflection point on the object side of the second lens that is the first nearest to the optical axis to the optical axis is denoted by HIF211. The distance perpendicular to the optical axis from the inflection point on the image side of the second lens that is the first nearest to the optical axis to the intersection point where the image side of the second lens crosses the optical axis is denoted by HIF221. The following conditions are satisfied: HIF211=0.8147 mm; and HIF211/HOI=0.2777.

The third lens 130 has negative refractive power and is made of plastic. An object side 132 of the third lens 130 is a concave surface and an image side 134 of the third lens 130 is a convex surface, and the object side 132 and the image side 134 are both aspheric. The image side 134 has one inflection point. The thickness of the third lens on the optical axis is TP3. The thickness of the third lens at the height of ½ entrance pupil diameter (HEP) is denoted by ETP3.

The distance parallel to the optical axis from an inflection point on the object side of the third lens that is the first nearest to the optical axis to an intersection point where the object side of the third lens crosses the optical axis is denoted by SGI311. The distance parallel to the optical axis from an inflection point on the image side of the third lens that is the first nearest to the optical axis to an intersection point where the image side of the third lens crosses the optical axis is denoted by SGI321. The following conditions are satisfied: SGI321=−0.1647 mm; |SGI321|/(|SGI321|+TP3)=0.1884.

The perpendicular distance between the inflection point on the object side of the third lens that is the first nearest to the optical axis and the optical axis is denoted by HIF311. The distance perpendicular to the optical axis between the inflection point on the image side of the third lens that is the first nearest to the optical axis and the intersection point where the image side of the third lens crosses the optical axis is denoted by HIF321. The following conditions are satisfied: HIF321=0.7269 mm; and HIF321/HOI=0.2477.

The fourth lens 140 has negative refractive power and is made of plastic. An object side 142 of the fourth lens 140 is a convex surface and an image side 144 of the fourth lens 140 is a concave surface, and the object side 142 and the image side 144 of the fourth lens 140 are both aspheric. The object side 142 has two inflection points, and the image side 144 has one inflection point. The thickness of the fourth lens on the optical axis is TP4. The thickness of the fourth lens at the height of ½ entrance pupil diameter (HEP) is denoted by ETP4.

The horizontal distance parallel to the optical axis from an inflection point on the object side of the fourth lens that is the first nearest to the optical axis to the intersection point where the object side of the fourth lens crosses the optical axis is denoted by SGI411. The horizontal distance parallel to the optical axis from an inflection point on the image side of the fourth lens that is the first nearest to the optical axis to the intersection point where the image side of the fourth lens crosses the optical axis is denoted by SGI421. The following conditions are satisfied: SGI411=0.0137 mm; SGI421=0.0922 mm; |SGI411|/(|SGI411|+TP4)=0.0155; and |SGI421|/(|SGI421|+TP4)=0.0956.

The horizontal distance parallel to the optical axis from an inflection point on the object side of the fourth lens that is the second nearest to the optical axis to the intersection point where the object side of the fourth lens crosses the optical axis is denoted by SGI412. The following conditions are satisfied: SGI412=−0.1518 mm; and |SGI412|/(|SGI412|+TP4)=0.1482.

The perpendicular distance between the inflection point on the object side of the fourth lens that is the first nearest to the optical axis and the optical axis is denoted by HIF411. The distance perpendicular to the optical axis between the inflection point on the image side of the fourth lens that is the first nearest to the optical axis and the intersection point where the image side of the fourth lens crosses the optical axis is denoted by HIF421. The following conditions are satisfied: HIF411=0.2890 mm; HIF421=0.5794 mm; HIF411/HOI=0.0985; HIF421/HOI=0.1975.

The perpendicular distance between the inflection point on the object side of the fourth lens that is the second nearest to the optical axis and the optical axis is denoted by HIF412. The following conditions are satisfied: HIF412=1.3328 mm; HIF412/HOI=0.4543.

In the first embodiment, the distance parallel to the optical axis between the coordinate point of the object side of the first lens at a height of ½ HEP and the image plane is denoted by ETL. The distance parallel to the optical axis between the coordinate point of the object side of the first lens at a height of ½ HEP and the coordinate point of the image side of the fourth lens at a height of ½ HEP is denoted by EIN. The following conditions may be satisfied: ETL=18.744 mm, EIN=12.339 mm and EIN/ETL=0.658.

The first embodiment satisfies the following conditions: ETP1=0.949 mm, ETP2=2.483 mm, ETP3=0.345 mm, and ETP4=1.168 mm. A sum of ETP1 to ETP4 described above SETP=4.945 mm; TP1=0.918 mm, TP2=2.500 mm, TP3=0.300 mm, and TP4=1.248 mm. A sum of TP1 to TP4 described above STP=4.966 mm; SETP/STP=0.996.

The first embodiment particularly controls the ratio relationship (ΣTP/TP) between the thickness (ΣTP) of each lens at a height of ½ entrance pupil diameter (HEP) and the thickness (TP) of the lens to which the surface belongs on the optical axis in order to achieve a balance between manufacturability and capability of aberration correction. The following relationships may be satisfied: ETP1/TP1=1.034; ETP2/TP2=0.993; ETP3/TP3=1.148; ETP4/TP4=0.936.

The first embodiment controls the horizontal distance between each two adjacent lenses at a height of ½ entrance pupil diameter (HEP) to achieve a balance between the degree of miniaturization for the length of the optical image capturing system HOS, the manufacturability and the capability of aberration correction. The ratio relationship (ED/IN) of the horizontal distance (ED) between the two adjacent lens at the height of ½ entrance pupil diameter (HEP) to the horizontal distance (IN) on the optical axis between the two adjacent lens is particularly controlled. The following relationships are satisfied: the horizontal distance parallel to the optical axis between the first lens and the second lens at a height of ½ entrance pupil diameter (HEP) ED12=4.529 mm. The horizontal distance parallel to the optical axis between the second lens and the third lens at a height of ½ entrance pupil diameter (HEP) ED23=2.735 mm. The horizontal distance parallel to the optical axis between the third lens and the fourth lens at a height of ½ entrance pupil diameter (HEP) ED34=0.131 mm.

The horizontal distance on the optical axis between the first lens and the second lens IN12=4.571 mm and ED12/IN12=0.991. The horizontal distance on the optical axis between the second lens and the third lens IN23=2.752 mm and ED23/IN23=0.994. The horizontal distance on the optical axis between the third lens and the fourth lens IN34=0.094 mm and ED34/IN34=1.387.

The horizontal distance parallel to the optical axis between a coordinate point on the image side of the fourth lens at the height of ½ HEP and the image plane is denoted by EBL=6.405 mm. The horizontal distance parallel to the optical axis between an intersection point where the image side of the fourth lens crosses the optical axis and the image plane is denoted by BL=6.3642 mm. The embodiment of the present invention may meet the following condition: EBL/BL=1.00641. In the first embodiment, the distance parallel to the optical axis between the coordinate point on the image side of the fourth lens at the height of ½ HEP and the IR-bandstop filter is denoted by EIR=0.065 mm. The distance parallel to the optical axis between the intersection point where the image side of the fourth lens crosses the optical axis and the IR-bandstop filter is denoted by PIR=0.025 mm. The following condition is satisfied: EIR/PIR=2.631.

The IR-cut filter 170 is made of glass, and disposed between the fourth lens 140 and the image plane 180, and does not affect the focal length of the optical image capturing system.

In the optical image capturing system of the first embodiment, the focal length of the optical image capturing system is denoted by f, the entrance pupil diameter of the optical image capturing system is denoted by HEP, and a half maximum angle of view of the optical image capturing system is denoted by HAF. The detailed parameters are shown as below: f=3.4375 mm; f/HEP=2.23; HAF=39.69° and tan(HAF)=0.8299.

In the optical image capturing system of the first embodiment, the focal length of the first lens is denoted by f1 and the focal length of the fourth lens is denoted by f4. The following conditions are satisfied: f1=3.2736 mm; |f/f1|=1.0501; f4=−8.3381 mm; and |1/f4|=0.3926.

In the optical image capturing system of the first embodiment, focal lengths of the second lens to the third lens is denoted by f2 and f3, respectively. The following conditions are satisfied: |f2|+|f3|=10.0976 mm; |f1|+|f4|=11.6116 mm; and |f2|+|f3|<|f1|+|f4|.

The ratio of the focal length f of the optical image capturing system to the focal length fp of each of lens with positive refractive power is denoted by PPR. The ratio of the focal length f of the optical image capturing system to a focal length fn of each of lens with negative refractive power is denoted by NPR. In the optical image capturing system of the first embodiment, the sum of the PPR of all lenses with positive refractive power is $\Sigma PPR=|f/f1|+|f/f2|=1.95585$. The sum of the NPR of all lenses with negative refractive powers is $\Sigma NPR=|f/f3|+|f/f4|=0.95770$, and $\Sigma PPR/|\Sigma NPR|=2.04224$. Simultaneously, the following conditions are also satisfied: $|f/f1|=1.05009$; $|f/f2|=0.90576$; $|f/f3|=0.54543$; and $|f/f4|=0.41227$.

In the optical image capturing system of the first embodiment, the distance from the object side 112 of the first lens to the image side 114 of the fourth lens is denoted by InTL. The distance from the object side 112 of the first lens to the image plane 180 is denoted by HOS. The distance from the aperture 100 to the image plane 180 is denoted by InS. A half diagonal length of the effective detection field of the image sensing device 190 is denoted by HOI. The distance from the image side 144 of the fourth lens to the image plane 180 is denoted by InB. The following conditions are satisfied: InTL+InB=HOS; HOS=4.4250 mm; HOI=2.9340 mm; HOS/HOI=1.5082; HOS/f=1.2873; InTL/HOS=0.7191; InS=4.2128 mm; and InS/HOS=0.95204.

In the optical image capturing system of the first embodiment, a total thickness of all lenses with refractive power on the optical axis is denoted by $\Sigma TP$. The following conditions are satisfied: $\Sigma TP=2.4437$ mm; and $\Sigma TP/InTL=0.76793$. Hereby, this configuration can keep the contrast ratio of the optical image capturing system and the yield rate about manufacturing lens at the same time, and provide the proper back focal length so as to accommodate other elements.

In the optical image capturing system of the first embodiment, the curvature radius of the object side 112 of the first lens is denoted by R1. The curvature radius of the image side 114 of the first lens is denoted by R2. The following condition is satisfied: $|R1/R2|=0.1853$. Hereby, the first lens has a suitable magnitude of positive refractive power, so as to prevent the longitudinal spherical aberration from increasing too fast.

In the optical image capturing system of the first embodiment, the curvature radius of the object side 142 of the first lens is denoted by R7, the curvature radius of the image side 144 of the first lens is denoted by R8, and the following condition is satisfied: $(R7-R8)/(R7+R8)=0.2756$. Hereby, this configuration is beneficial for correcting the astigmatism generated by the optical image capturing system.

In the optical image capturing system of the first embodiment, focal lengths of the first lens 110 and the second lens 120 are f1 and f2, respectively, and the sum of focal lengths of all lenses with positive refractive power is denoted by $\Sigma PP$. The following conditions are satisfied: $\Sigma PP=f1+f2=7.0688$ mm; and $f1/(f1+f2)=0.4631$. Hereby, this configuration is helpful to distribute the positive refractive power of a first lens 110 to other lens with positive refractive powers in an appropriate way, so as to suppress the generation of noticeable aberrations in the propagating process of the incident light in the optical image capturing system.

In the optical image capturing system of the first embodiment, focal lengths of the third lens 130 and the fourth lens 140 are f3 and f4, respectively, and the sum of focal lengths of all lenses with negative refractive power is denoted by $\Sigma NP$. The following conditions are satisfied: $\Sigma NP=f3+f4=-14.6405$ mm; and $f4/(f2+f4)=0.5695$. Hereby, this configuration is helpful to distribute the negative refractive power of the fourth lens to other lens with negative refractive powers in an appropriate way, so as to suppress the generation of noticeable aberrations in the propagating process of the incident light in the optical image capturing system.

In the optical image capturing system of the first embodiment, a distance on the optical axis between the first lens 110 and the second lens 120 is denoted by IN12. The following conditions are satisfied: IN12=0.3817 mm; IN12/f=0.11105. Therefore, this configuration is helpful to improve the chromatic aberration of the lens in order to elevate the performance of the optical image capturing system of the first embodiment.

In the optical image capturing system of the first embodiment, a distance on the optical axis between the second lens 120 and the third lens 130 is denoted by IN23. The following conditions are satisfied: IN23=0.0704 mm; IN23/f=0.02048. Therefore, this configuration is helpful to improve the chromatic aberration of the lens in order to elevate the performance of the optical image capturing system of the first embodiment.

In the optical image capturing system of the first embodiment, a distance on the optical axis between the third lens 130 and the fourth lens is denoted by IN34. The following conditions are satisfied: IN34=0.2863 mm; IN34/f=0.08330. Therefore, this configuration is helpful to improve the chromatic aberration of the lens in order to elevate the performance of the optical image capturing system of the first embodiment.

In the optical image capturing system of the first embodiment, the thicknesses of the first lens 110 and the second lens 120 on the optical axis is denoted by TP1 and TP2, respectively. The following conditions are satisfied: TP1=0.46442 mm; TP2=0.39686 mm; TP1/TP2=1.17023; and (TP1+IN12)/TP2=2.13213. Therefore, this configuration is helpful to control the sensitivity generated by the optical image capturing system and elevate the performance of the optical image capturing system of the first embodiment.

In the optical image capturing system of the first embodiment, the thicknesses of the third lens 130 and the fourth lens 140 on the optical axis is denoted by TP3 and TP4, respectively. The distance on the optical axis between the third lens and the fourth lens is denoted by IN34. The following conditions are satisfied: TP3=0.70989 mm; TP4=0.87253 mm; TP3/TP4=0.81359 and (TP4+IN34)/TP3=1.63248. Therefore, this configuration is helpful to control the sensitivity generated by the optical image capturing system and decrease the total height of the optical image capturing system.

In the optical image capturing system of the first embodiment, the following condition is satisfied: IN23/(TP2+IN23+TP3)=0.05980. Therefore, it is beneficial to slightly correct the aberration generated by the incident light advancing in the process layer upon layer so as to decrease the overall height of the system.

In the optical image capturing system of the first embodiment, a horizontal distance parallel to the optical axis from an intersection point where the object side 142 of the fourth lens crosses the optical axis to a maximum effective half diameter position on the object side 142 of the fourth lens is denoted by InRS41. The horizontal distance parallel to the optical axis from an intersection point where the image side 144 of the fourth lens 140 crosses the optical axis to a maximum effective half diameter position on the image side 144 of the fourth lens 140 is denoted by InRS42. The thickness of the fourth lens 140 on the optical axis is denoted by TP4. The following conditions are satisfied: InRS41=-0.23761 mm; InRS42=-0.20206 mm; |InRS41|+|InRS42|=0.43967 mm; |InRS41|/TP4=0.27232; and |InRS42|/TP4=0.23158. Hereby, this configuration is favorable for manufacturing and forming of lens and keeps the miniaturization of the optical image capturing system effectively.

In the optical image capturing system of the first embodiment, the perpendicular distance between a critical point C41 on the object side 142 of the fourth lens and the optical axis is denoted by HVT41. The perpendicular distance between a critical point C42 on the image side 144 of the fourth lens and the optical axis is denoted by HVT42. The following conditions are satisfied: HVT41=0.5695 mm; HVT42=1.3556 mm; and HVT41/HVT42=0.4201. Hereby, the off-axis aberration can be corrected effectively.

In the optical image capturing system of the first embodiment, the following condition is satisfied: HVT42/HOI=0.4620. Therefore, this configuration is helpful to correct the aberration of surrounding field of view of the optical image capturing system.

In the optical image capturing system of the first embodiment, the following condition is satisfied: HVT42/HOS=0.3063. Therefore, this configuration is helpful to correct the aberration of surrounding field of view of the optical image capturing system.

In the optical image capturing system of the first embodiment, the second lens, the coefficient of dispersion of the first lens is denoted by NA1, the coefficient of dispersion of the second lens is denoted by NA2, the coefficient of dispersion of the third lens is denoted by NA3, and the coefficient of dispersion of the fourth lens is denoted by NA4. The following condition is satisfied: |NA1−NA2|=0; and NA3/NA2=0.39921. Therefore, this configuration is helpful to correct the chromatic aberration of the optical image capturing system.

In the optical image capturing system of the first embodiment, TV distortion and optical distortion for image formation in the optical image capturing system is denoted by TDT and ODT, respectively. The following conditions are satisfied: |TDT|=0.4%; |ODT|=2.5%.

In the optical image capturing system of the present embodiment, the contrast transfer rates of modulation transfer with spatial frequencies of 220 cycles/mm (MTF values) at the optical axis on the image plane, 0.3 HOT and 0.7 HOI are respectively denoted by MTFH0, MTFH3 and MTFH7. The following relations are satisfied: MTFH0 is about 0.525, MTFH3 is about 0.375 and MTFH7 is about 0.35.

Please refer to table 1 and table 2.

TABLE 1

Lens Parameters for the First Embodiment
f = 3.4375 mm; f/HEP = 2.23; HAF = 39.6900 deg; tan(HAF) = 0.8299

| Surface | | Curvature Radius | Thickness | Material | Refractive index | Dispersion coefficient | Focal length |
|---|---|---|---|---|---|---|---|
| 0 | Object | Plano | At infinity | | | | |
| 1 | Lens 1/ Aperture | 1.466388 | 0.464000 | Plastic | 1.535 | 56.07 | 3.274 |
| 2 | | 7.914480 | 0.382000 | | | | |
| 3 | Lens 2 | −5.940659 | 0.397000 | Plastic | 1.535 | 56.07 | 3.795 |
| 4 | | −1.551401 | 0.070000 | | | | |
| 5 | Lens 3 | −0.994576 | 0.710000 | Plastic | 1.642 | 22.46 | −6.302 |
| 6 | | −1.683933 | 0.286000 | | | | |
| 7 | Lens 4 | 2.406736 | 0.873000 | Plastic | 1.535 | 56.07 | −8.338 |
| 8 | | 1.366640 | 0.213000 | | | | |
| 9 | IR-cut filter | Plano | 0.210000 | BK7_SCHOTT | 1.517 | 64.13 | |
| 10 | | Plano | 0.820000 | | | | |
| 11 | Image plane | Plano | | | | | |

Reference wavelength = 555 nm; Shield position: the clear aperture of the eighth surface is 2.320 nun.

Table 2 is the aspheric coefficients of the first embodiment.

TABLE 2

| Aspheric Coefficients | | | | | | |
|---|---|---|---|---|---|---|
| Surface | 1 | 2 | 3 | 4 | 5 | 6 |
| k= | −1.595426E+00 | −7.056632E+00 | −2.820679E+01 | −1.885740E+00 | 1.013988E−01 | −3.460337E+01 |
| A4= | −4.325520E−04 | −2.633963E−02 | −1.367865E−01 | −9.745260E−02 | 2.504976E−01 | −9.580611E−01 |
| A6= | 1.103749E+00 | 2.088207E−02 | 3.135755E−01 | −1.032177E+00 | −1.640463E+00 | 3.303418E+00 |
| A8= | −8.796867E+00 | −1.122861E−01 | −6.149514E+00 | 8.016230E+00 | 1.354700E+01 | −8.544412E+00 |
| A10= | 3.981982E+01 | −7.137813E−01 | 3.883332E+01 | −4.215882E+01 | −6.223343E+01 | 1.602487E+01 |
| A12= | −1.102573E+02 | 2.236312E+00 | −1.463622E+02 | 1.282874E+02 | 1.757259E+02 | −2.036011E+01 |
| A14= | 1.900642E+02 | −2.756503E+00 | 3.339863E+02 | −2.229568E+02 | −2.959459E+02 | 1.703516E+01 |
| A16= | −2.000279E+02 | 1.557080E+00 | −4.566510E+02 | 2.185571E+02 | 2.891641E+02 | −8.966359E+00 |
| A18= | 1.179848E+02 | −2.060190E+00 | 3.436469E+02 | −1.124538E+02 | −1.509364E+02 | 2.684766E+00 |
| A20= | −3.023405E+01 | 2.029630E+00 | −1.084572E+02 | 2.357571E+01 | 3.243879E+01 | −3.481557E−01 |

| Surface | 7 | 8 |
|---|---|---|
| k= | −4.860907E+01 | −7.091499E+00 |
| A4= | −2.043197E−01 | −8.148585E−02 |
| A6= | 6.516636E−02 | 3.050566E−02 |
| A8= | 4.863926E−02 | −8.218175E−03 |
| A10= | −7.086809E−02 | 1.186528E−03 |

TABLE 2-continued

| Aspheric Coefficients | | |
|---|---|---|
| A12= | 3.815824E−02 | −1.305021E−04 |
| A14= | −1.032930E−02 | 2.886943E−05 |
| A16= | 1.413303E−03 | −6.459004E−06 |
| A18= | −8.701682E−05 | 6.571792E−07 |
| A20= | 1.566415E−06 | −2.325503E−08 |

Table 1 is the detailed structure data to the first embodiment, wherein the unit of the curvature radius, the thickness, the distance, and the focal length is millimeters (mm). Surfaces 0-11 illustrate the surfaces from the object side to the image side. Table 2 is the aspheric coefficients of the first embodiment, wherein k is the conic coefficient in the aspheric surface formula. A1-A20 are aspheric surface coefficients from the first to the twentieth orders for each surface. In addition, the tables for each of the embodiments as follows correspond to the schematic views and the aberration graphs for each of the embodiments. The definitions of data in the tables are the same as those in table 1 and table 2 for the first embodiment. Therefore, similar description shall not be illustrated again. Furthermore, the definitions of element parameters in each of the embodiments are the same as those in the first embodiment.

Second Embodiment

Figure 2A:
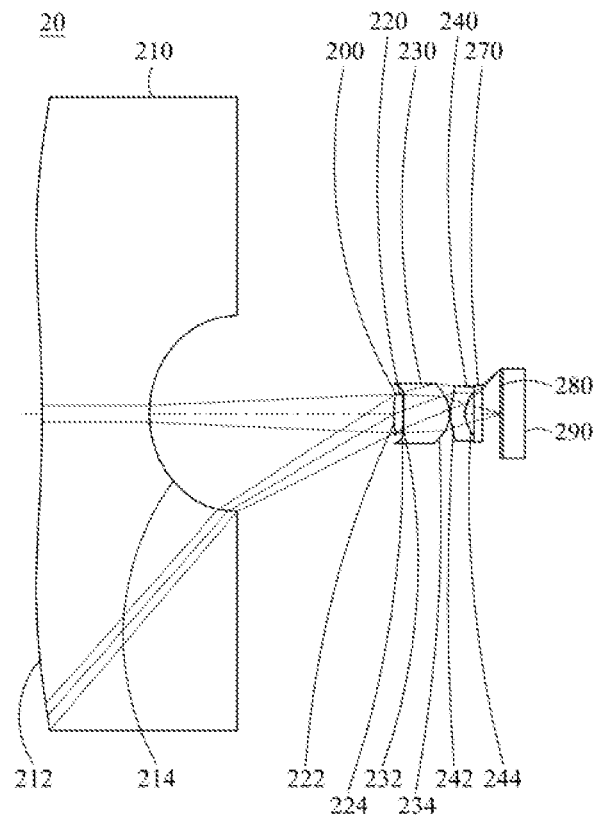
FIG. 2A is a schematic view of the optical image capturing system according to the second embodiment of the present invention.
Figure 2B:
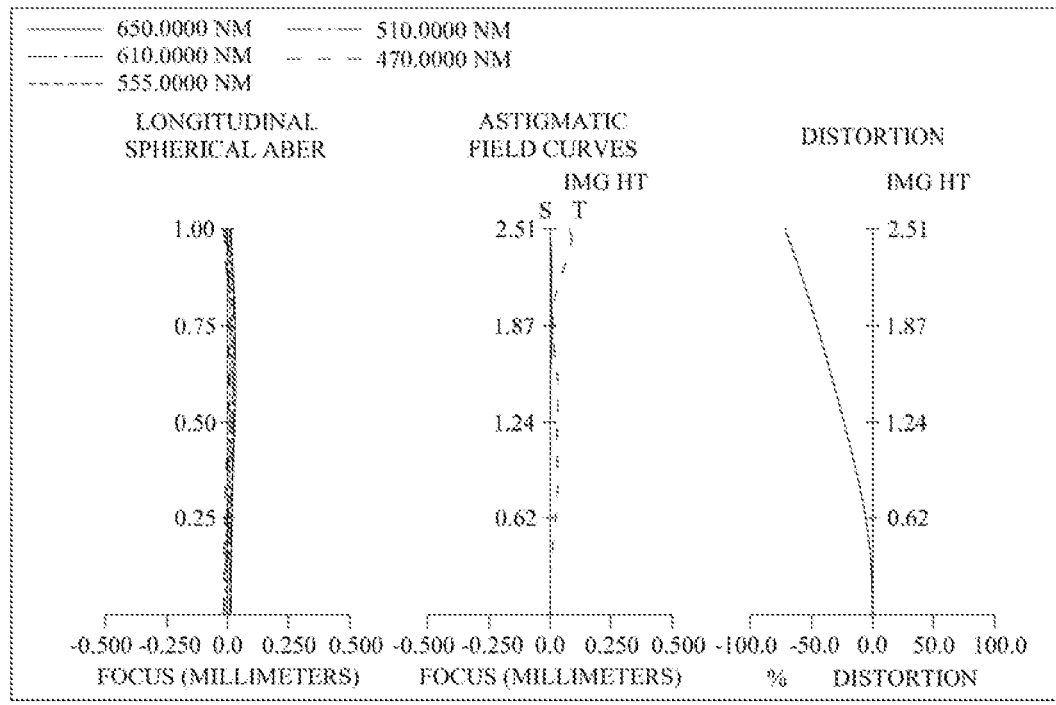
FIG. 2B is a curve diagram illustrating the spherical aberration, astigmatism and optical distortion of the optical image capturing system in order from left to right according to the second embodiment of the present invention.
Figure 2C:
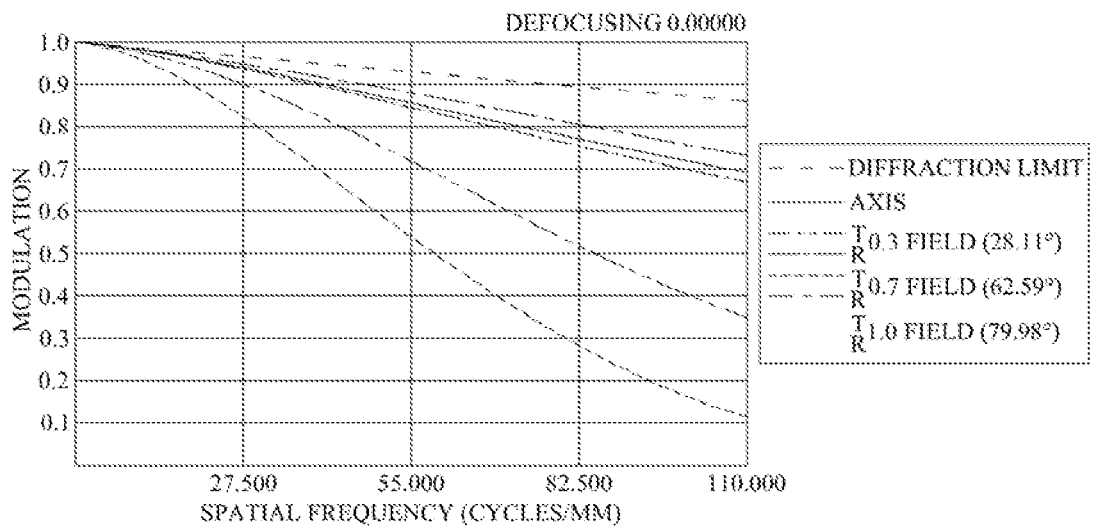
FIG. 2C is a characteristic diagram of modulation transfer of visible light spectrum for the optical image capturing system according to the second embodiment of the present invention.

Please refer to FIGS. 2A to 2C. FIG. 2A is a schematic view of the optical image capturing system according to the second embodiment of the present invention. FIG. 2B is a curve diagram illustrating the spherical aberration, astigmatism and optical distortion of the optical image capturing system in order from left to right according to the second embodiment of the present invention. FIG. 2C is a characteristic diagram of modulation transfer of visible light spectrum for the optical image capturing system according to the second embodiment of the present invention. As shown in FIG. 2A, an optical image capturing system includes, in the order from the object side to the image side, a first lens 210, an aperture 200, a second lens 220, a third lens 230, a fourth lens 240, an IR-cut filter 270, an image plane 280, and an image sensor element 290.

The first lens 210 has negative refractive power and is made of glass. The object side 212 of the first lens 210 is a concave surface and the image side 214 of the first lens 210 is a concave surface, and the object side 212 and the image side 214 are aspheric. The object side 212 has one inflection point.

The second lens 220 has positive refractive power and is made of glass. The object side 222 of the second lens 220 is a convex surface and the image side 224 of the second lens 220 is a concave surface, and the object side 222 and the image side 224 are aspheric. The object side 222 has one inflection point.

The third lens 230 has positive refractive power and is made of glass. An object side 232 of the third lens 230 is a convex surface and an image side 234 of the third lens 230 is a convex surface, and the object side 232 and the image side 234 are both aspheric. The object side 232 has one inflection point.

The fourth lens 240 has negative refractive power and is made of glass. An object side 242 of the fourth lens 240 is a convex surface and an image side 244 of the fourth lens 240 is a concave surface, and the object side 242 and the image side 244 of the fourth lens 240 are both aspheric. The object side 242 has one inflection point.

The IR-cut filter 270 is made of glass, and disposed between the fourth lens 240 and the image plane 280, and does not affect the focal length of the optical image capturing system.

Please refer to table 3 and table 4.

TABLE 3

Lens Parameters for the Second Embodiment
f = 1.5290 mm; f/HEP = 1.8; HAF = 80.0054 deg

| Surface | | Curvature Radius | Thickness (mm) | Material | Refractive index | Dispersion coefficient | Focal length |
|---|---|---|---|---|---|---|---|
| 0 | Object | 1E+18 | 1E+13 | | | | |
| 1 | Lens 1 | −73.60316052 | 6.229 | Glass | 1.497 | 81.61 | −10.376 |
| 2 | | 5.714911293 | 14.385 | | | | |
| 3 | Aperture | 1E+18 | −0.055 | | | | |
| 4 | Lens 2 | 4.759365624 | 0.513 | Glass | 1.497 | 81.61 | 10.503 |
| 5 | | 50.83650328 | 0.050 | | | | |
| 6 | Lens 3 | 10.21380992 | 2.675 | Glass | 1.497 | 81.61 | 3.303 |
| 7 | | −1.7904464 | 0.071 | | | | |
| 8 | Lens 4 | 2.490042057 | 0.837 | Glass | 2.003 | 19.32 | −5.185 |
| 9 | | 1.403297726 | 0.500 | | | | |
| 10 | IR-cut filter | 1E+18 | 0.500 | BK7_SCHOTT | 1.517 | 64.13 | |
| 11 | | 1E+18 | 1.030 | | | | |
| 12 | Image plane | 1E+18 | 0.016 | | | | |

Reference wavelength = 555 nm

Table 4 is the aspheric coefficients of the second embodiment.

TABLE 4

| Aspheric Coefficients | | | | | | |
|---|---|---|---|---|---|---|
| Surface | 1 | 2 | 4 | 5 | 6 | 7 |
| k= | 2.013685E−01 | −9.677787E−04 | 8.271116E+00 | −5.000000E+01 | −5.363249E+00 | −1.680143E+00 |
| A4= | 3.812860E−05 | −2.492670E−04 | −4.187081E−02 | −6.429945E−02 | −4.146085E−02 | −1.305598E−02 |
| A6= | 5.151307E−09 | 4.315724E−05 | −8.023681E−03 | −3.195138E−03 | −6.560781E−03 | −1.896454E−03 |
| A8= | −2.445251E−10 | −2.471951E−06 | −2.827537E−03 | 2.155353E−03 | 8.294079E−03 | 2.596549E−04 |
| A10= | 3.398120E−13 | 5.486941E−08 | −1.095324E−04 | −1.059580E−04 | −3.048144E−03 | −1.201103E−04 |
| A12= | 0.000000E+00 | 0.000000E+00 | 0.000000E+00 | 0.000000E+00 | 0.000000E+00 | 0.000000E+00 |

| Surface | 8 | 9 |
|---|---|---|
| k= | −3.608045E+00 | −1.757033E+00 |
| A4= | −1.004479E−02 | −1.844993E−02 |
| A6= | −6.988006E−03 | −4.654209E−03 |
| A8= | 5.677213E−04 | 2.624543E−03 |
| A10= | −4.642104E−05 | −2.956906E−04 |
| A12= | 0.000000E+00 | 0.000000E+00 |

In the second embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 3 and table 4.

| Second embodiment (Reference wavelength = 555 nm) | | | | | |
|---|---|---|---|---|---|
| MTFE0 | MTFE3 | MTFE7 | MTFQ0 | MTFQ3 | MTFQ7 |
| 0.85 | 0.73 | 0.54 | 0.69 | 0.35 | 0.12 |
| ETP1 | ETP2 | ETP3 | ETP4 | ED12/ED23 | SED |
| 6.246 | 0.494 | 2.617 | 0.864 | 248.099 | 14.547 |
| ETP1/TP1 | ETP2/TP2 | ETP3/TP3 | ETP4/TP4 | ED23/ED34 | SETP |
| 1.003 | 0.964 | 0.978 | 1.033 | 0.370 | 10.222 |
| ETL | EBL | EIN | EIR | PIR | STP |
| 26.752 | 1.983 | 24.768 | 0.437 | 0.500 | 10.253 |
| EIN/ETL | SETP/EIN | EIR/PIR | EBL/BL | BL | SETP/STP |
| 0.926 | 0.413 | 0.875 | 0.9693 | 2.0459 | 0.997 |
| ED12 | ED23 | ED34 | ED12/IN12 | ED23/IN23 | ED34/IN34 |
| 14.333 | 0.058 | 0.156 | 1.000 | 1.155 | 2.211 |
| InRS41 | InRS42 | HVT41 | HVT42 | ODT % | TDT % |
| 0.25817 | 0.60403 | 1.53836 | 0.00000 | −71.23410 | 71.23410 |
| \|f/f1\| | \|f/f2\| | \|f/f3\| | \|f/f4\| | \|f1/f2\| | \|f2/f3\| |
| 0.14736 | 0.14558 | 0.46289 | 0.29486 | 0.98788 | 3.17972 |
| ΣPPR | ΣNPR | ΣPPR/\|ΣNPR\| | ΣPP | ΣNP | f1/ΣPP |
| 0.60846 | 0.44222 | 1.37592 | 13.80586 | −15.56083 | 0.76075 |
| f4/ΣNP | IN12/f | IN23/f | IN34/f | TP3/f | TP4/f |
| 0.66677 | 9.37284 | 0.03270 | 0.04617 | 1.74967 | 0.54724 |
| InTL | HOS | HOS/HOI | InS/HOS | InTL/HOS | ΣTP/InTL |
| 24.70450 | 26.75040 | 10.70016 | 0.22940 | 0.92352 | 0.41504 |
| (TP1 + IN12)/TP2 | (TP4 + IN34)/TP3 | TP1/TP2 | TP3/TP4 | IN23/(TP2 + IN23 + TP3) | |
| 40.09943 | 0.33916 | 12.14868 | 3.19724 | 0.01544 | |
| \|InRS41\|/TP4 | \|InRS42\|/TP4 | HVT42/HOI | HVT42/HOS | | |
| 0.3086 | 0.7219 | 0.0000 | 0.0000 | | |

The values stated as follows can be obtained according to table 3 and table 4.

| Values Related to Inflection Point of Second Embodiment (Primary Reference Wavelength = 555 nm) | | | | | | |
|---|---|---|---|---|---|---|
| HIF111 | 5.5198 | HIF111/HOI | 2.2079 | SGI111 | −0.1720 | \|SGI111\|/(\|SGI111\| + TP1) | 0.0269 |
| HIF211 | 0.6652 | HIF211/HOI | 0.2661 | SGI211 | 0.0398 | \|SGI211\|/(\|SGI211\| + TP2) | 0.0720 |
| HIF221 | 0.1593 | HIF221/HOI | 0.0637 | SGI221 | 0.0002 | \|SGI221\|/(\|SGI221\| + TP2) | 0.0004 |
| HIF311 | 0.4315 | HIF311/HOI | 0.1726 | SGI311 | 0.0076 | \|SGI311\|/(\|SGI311\| + TP3) | 0.0028 |
| HIF411 | 0.9393 | HIF411/HOI | 0.3757 | SGI411 | 0.1509 | \|SGI411\|/(\|SGI411\| + TP4) | 0.1528 |

The values related to arc lengths can be obtained according to table 3 and table 4.

Second embodiment (Reference wavelength = 555 nm)

| ARE | 1/2 (HEP) | ARE value | ARE-1/2(HEP) | 2(ARE/HEP) % | TP | ARE/TP (%) |
|---|---|---|---|---|---|---|
| 11 | 0.425 | 0.424 | −0.00070 | 99.83% | 6.229 | 6.81% |
| 12 | 0.425 | 0.424 | −0.00032 | 99.93% | 6.229 | 6.81% |
| 21 | 0.425 | 0.424 | −0.00022 | 99.95% | 0.513 | 82.79% |
| 22 | 0.425 | 0.424 | −0.00070 | 99.83% | 0.513 | 82.70% |
| 31 | 0.425 | 0.424 | −0.00063 | 99.85% | 2.675 | 15.85% |
| 32 | 0.425 | 0.428 | 0.00322 | 100.76% | 2.675 | 16.00% |
| 41 | 0.425 | 0.426 | 0.00120 | 100.28% | 0.837 | 50.90% |
| 42 | 0.425 | 0.430 | 0.00527 | 101.24% | 0.837 | 51.39% |

| ARS | EHD | ARS value | ARS-EHD | (ARS/EHD) % | TP | ARS/TP (%) |
|---|---|---|---|---|---|---|
| 11 | 18.551 | 18.613 | 0.06150 | 100.33% | 6.229 | 298.82% |
| 12 | 5.663 | 8.574 | 2.91066 | 151.40% | 6.229 | 137.65% |
| 21 | 1.035 | 1.038 | 0.00251 | 100.24% | 0.513 | 202.37% |
| 22 | 1.163 | 1.174 | 0.01128 | 100.97% | 0.513 | 229.08% |
| 31 | 1.214 | 1.215 | 0.00173 | 100.14% | 2.675 | 45.43% |
| 32 | 1.764 | 2.076 | 0.31137 | 117.65% | 2.675 | 77.59% |
| 41 | 1.593 | 1.619 | 0.02605 | 101.63% | 0.837 | 193.55% |
| 42 | 1.552 | 1.686 | 0.13430 | 108.66% | 0.837 | 201.50% |

Third Embodiment

Figure 3A:
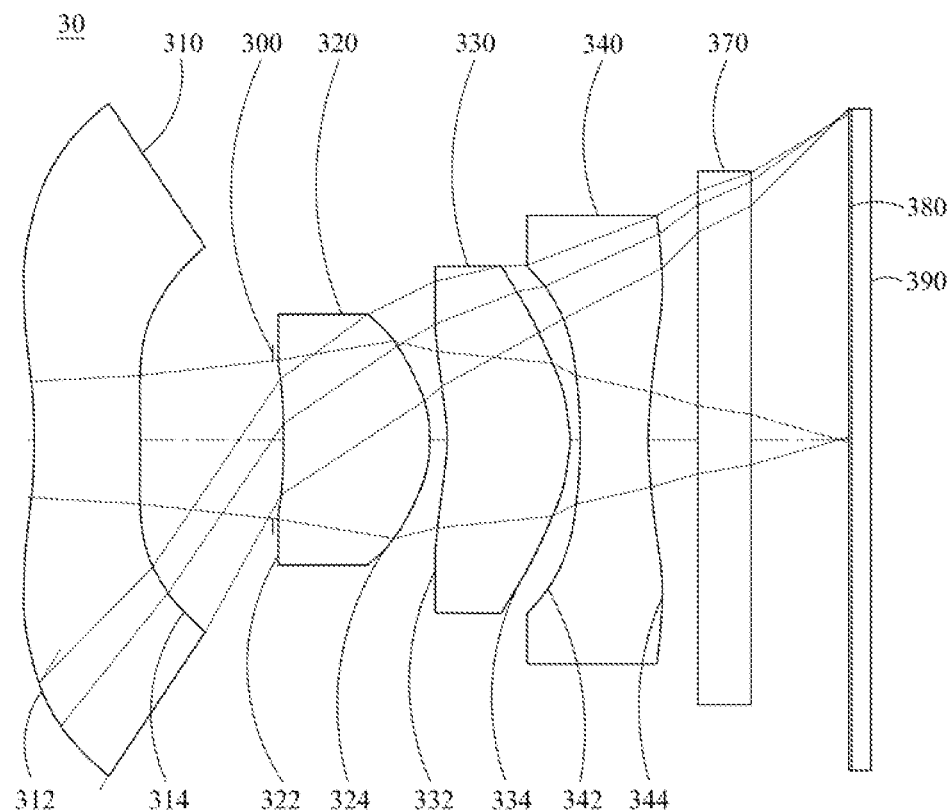
FIG. 3A is a schematic view of the optical image capturing system according to the third embodiment of the present invention.
Figure 3B:
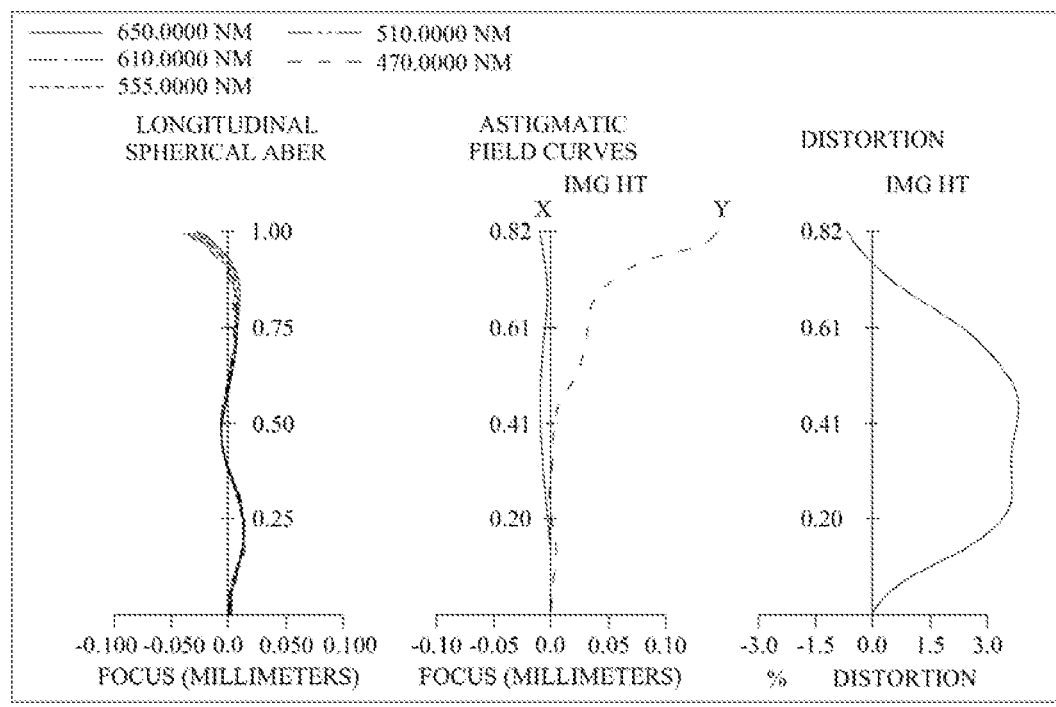
FIG. 3B is a curve diagram illustrating the spherical aberration, astigmatism and optical distortion of the optical image capturing system in order from left to right according to the third embodiment of the present invention.
Figure 3C:
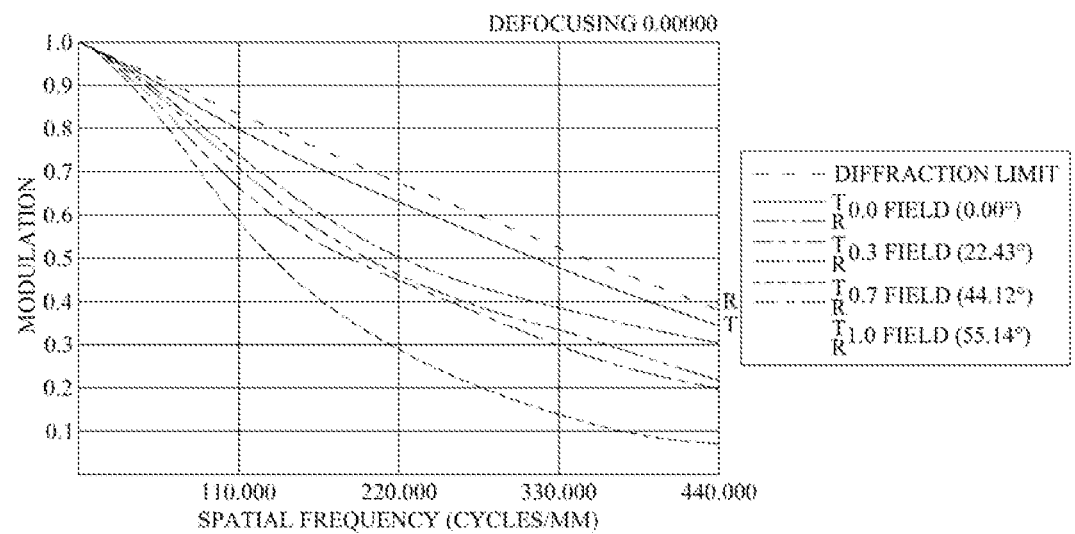
FIG. 3C is a characteristic diagram of modulation transfer of visible light spectrum for the optical image capturing system according to the third embodiment of the present invention.

Please refer to FIGS. 3A to 3C. FIG. 3A is a schematic view of the optical image capturing system according to the third embodiment of the present invention. FIG. 3B is a curve diagram illustrating the spherical aberration, astigmatism and optical distortion of the optical image capturing system in order from left to right according to the third embodiment of the present invention. FIG. 3C is a characteristic diagram of modulation transfer of visible light spectrum for the optical image capturing system according to the third embodiment of the present invention. As shown in FIG. 3A, an optical image capturing system includes, in the order from the object side to the image side, a first lens 310, an aperture 300, a second lens 320, a third lens 330, a fourth lens 340, an IR-cut filter 370, an image plane 380, and an image sensor element 390.

The first lens 310 has negative refractive power and is made of plastic. The object side 312 of the first lens 310 is a concave surface and the image side 314 of the first lens 310 is a convex surface, and the object side 312 and the image side 314 are aspheric. The object side 312 has two inflection points and the image side 314 has two inflection points.

The second lens 320 has positive refractive power and is made of plastic. The object side 322 of the second lens 320 is a concave surface and the image side 324 of the second lens 320 is a convex surface, and the object side 322 and the image side 324 are aspheric.

The third lens 330 has positive refractive power and is made of plastic. An object side 332 of the third lens 330 is a concave surface and an image side 334 of the third lens 330 is a convex surface, and the object side 332 and the image side 334 are both aspheric.

The object side 332 has one inflection point and the image side 334 has one inflection point.

The fourth lens 340 has negative refractive power and is made of plastic. An object side 342 of the fourth lens 340 is a concave surface and an image side 344 of the fourth lens 340 is a concave surface, and the object side 342 and the image side 344 are both aspheric.

The object side 342 has one inflection point and the image side 344 has two inflection points.

The IR-cut filter 370 is made of glass, and disposed between the fourth lens 340 and the image plane 380, and does not affect the focal length of the optical image capturing system.

Please refer to table 5 and table 6.

TABLE 5

Lens Parameters for the Third Embodiment
f = 0.5732 mm; f/HEP = 2.001; HAF = 55.1442 deg

| Surface | | Curvature Radius | Thickness (mm) | Material | Refractive index | Dispersion coefficient | Focal length |
|---|---|---|---|---|---|---|---|
| 0 | Object | 1E+18 | 600 | | | | |
| 1 | Lens 1 | −0.730754991 | 0.286 | Plastic | 1.537 | 55.885 | −1.695 |
| 2 | | −4.17366437 | 0.366 | | | | |
| 3 | Aperture | 1E+18 | 0.029 | | | | |
| 4 | Lens 2 | −5.737461361 | 0.400 | Plastic | 1.545 | 55.960 | 0.463 |
| 5 | | −0.248203508 | 0.048 | | | | |
| 6 | Lens 3 | −0.442859784 | 0.336 | Plastic | 1.545 | 55.960 | 1.033 |
| 7 | | −0.314673937 | 0.027 | | | | |
| 8 | Lens 4 | −1.280130215 | 0.188 | Plastic | 1.671 | 19.233 | −0.709 |
| 9 | | 0.813350562 | 0.138 | | | | |
| 10 | IR-cut filter | 1E+18 | 0.145 | BK7_SCHOTT | 1.517 | 64.167 | |
| 11 | | 1E+18 | 0.265 | | | | |
| 12 | Image plane | 1E+18 | 0.000 | | | | |

Reference wavelength = 555 nm; shield position: the clear aperture of the first surface is 0.838 mm, and the clear aperture of the fifth surface is 0.323 mm.

Table 6 is the aspheric coefficients of the third embodiment.

TABLE 6

| | Aspheric Coefficients | | | | | |
|---|---|---|---|---|---|---|
| Surface | 1 | 2 | 4 | 5 | 6 | 7 |
| k= | −1.984228E+01 | −4.190939E+02 | −1.084754E+02 | −2.626511E+00 | −1.434174E+01 | −3.900734E+00 |
| A4= | 1.441617E+00 | 5.579061E+00 | −1.996015E+01 | 1.561384E+00 | 5.352698E+00 | −2.680312E−01 |
| A6= | 1.145786E+00 | 2.759302E+01 | 3.688079E+03 | −1.705355E+02 | 1.737948E−01 | 5.023571E+01 |
| A8= | −4.597685E+01 | −1.565040E+03 | −4.274701E+05 | 6.832646E+03 | −1.808051E+03 | −3.029452E+03 |
| A10= | 2.945245E+02 | 2.610708E+04 | 2.822270E+07 | −2.265129E+05 | 4.766946E+04 | 7.026765E+04 |
| A12= | −1.020495E+03 | −2.340393E+05 | −1.142956E+09 | 4.673621E+06 | −7.047944E+05 | −8.688363E+05 |
| A14= | 2.143769E+03 | 1.211597E+06 | 2.872745E+10 | −5.855575E+07 | 6.361025E+06 | 6.213238E+06 |
| A16= | −2.721983E+03 | −3.481534E+06 | −4.351594E+11 | 4.276857E+08 | −3.431823E+07 | −2.579683E+07 |
| A18= | 1.925917E+03 | 4.810906E+06 | 3.612052E+12 | −1.647147E+09 | 1.017641E+08 | 5.772047E+07 |
| A20= | −5.838729E+02 | −2.081335E+06 | −1.245840E+13 | 2.520859E+09 | −1.277000E+08 | −5.357305E+07 |

| | Surface | | 8 | | 9 | |
|---|---|---|---|---|---|---|
| | k= | | −1.043017E+02 | | −6.413459E+00 | |
| | A4= | | −5.680660E+00 | | −2.826207E+00 | |
| | A6= | | 2.131613E+02 | | 2.816674E+01 | |
| | A8= | | −6.703643E+03 | | −3.441819E+02 | |
| | A10= | | 1.163798E+05 | | 2.887089E+03 | |
| | A12= | | −1.217166E+06 | | −1.613966E+04 | |
| | A14= | | 7.736014E+06 | | 5.873011E+04 | |
| | A16= | | −2.902780E+07 | | −1.311416E+05 | |
| | A18= | | 5.883393E+07 | | 1.616065E+05 | |
| | A20= | | −4.930180E+07 | | −8.365466E+04 | |

In the third embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 5 and table 6.

| Third embodiment (Reference wavelength = 555 nm) | | | | | |
|---|---|---|---|---|---|
| MTFE0 | MTFE3 | MTFE7 | MTFQ0 | MTFQ3 | MTFQ7 |
| 0.92 | 0.9 | 0.87 | 0.8 | 0.71 | 0.58 |
| ETP1 | ETP2 | ETP3 | ETP4 | ED12/ED23 | SED |
| 0.298 | 0.368 | 0.323 | 0.207 | 5.688 | 0.507 |
| ETP1/TP1 | ETP2/TP2 | ETP3/TP3 | ETP4/TP4 | ED23/ED34 | SETP |
| 1.041 | 0.918 | 0.962 | 1.101 | 1.430 | 1.196 |
| ETL | EBL | EIN | EIR | PIR | STP |
| 2.240 | 0.537 | 1.703 | 0.127 | 0.138 | 1.211 |
| EIN/ETL | SETP/EIN | EIR/PIR | EBL/BL | BL | SETP/STP |
| 0.760 | 0.702 | 0.919 | 0.9797 | 0.5481 | 0.988 |
| ED12 | ED23 | ED34 | ED12/IN12 | ED23/IN23 | ED34/IN34 |
| 0.391 | 0.069 | 0.048 | 0.989 | 1.438 | 1.784 |
| InRS41 | InRS42 | HVT41 | HVT42 | ODT % | TDT % |
| −0.14163 | 0.02324 | 0.00000 | 0.38929 | 3.83888 | 4.38324 |
| \|f/f1\| | \|f/f2\| | \|f/f3\| | \|f/f4\| | \|f1/f2\| | \|f2/f3\| |
| 0.33817 | 1.23817 | 0.55475 | 0.80886 | 3.66137 | 0.44804 |
| ΣPPR | ΣNPR | ΣPPR/\|ΣNPR\| | ΣPP | ΣNP | f1/ΣPP |
| 1.79291 | 1.14704 | 1.56309 | 1.49629 | −2.40378 | 0.30941 |
| f4/ΣNP | IN12/f | IN23/f | IN34/f | TP3/f | TP4/f |
| 0.70518 | 0.68932 | 0.08334 | 0.04683 | 0.58608 | 0.32801 |
| InTL | HOS | HOS/HOI | InS/HOS | InTL/HOS | ΣTP/InTL |
| 1.68031 | 2.22845 | 2.71762 | 0.70734 | 0.75403 | 0.72044 |
| (TP1 + IN12)/TP2 | (TP4 + IN34)/TP3 | TP1/TP2 | TP3/TP4 | IN23/(TP2 + IN23 + TP3) | |
| 1.70096 | 0.63957 | 0.71433 | 1.78678 | 0.06092 | |
| \|InRS41\|/TP4 | \|InRS42\|/TP4 | HVT42/HOI | HVT42/HOS | | |
| 0.7532 | 0.1236 | 0.4747 | 0.1747 | | |

The values stated as follows can be obtained according to table 5 and table 6.

| Values Related to Inflection Point of Third Embodiment (Primary Reference Wavelength = 555 nm) | | | | | | | | |
|---|---|---|---|---|---|---|---|---|
| HIF111 | 0.1694 | HIF111/HOI | 0.2066 | SGI111 | −0.01504 | \|SGI111\|/(\|SGI111\| + TP1) | 0.0500 |
| HIF112 | 0.8250 | HIF112/HOI | 1.0061 | SGI112 | 0.1847 | \|SGI112\|/(\|SGI112\| + TP1) | 0.3923 |
| HIF121 | 0.0559 | HIF121/HOI | 0.0682 | SGI121 | −0.0003 | \|SGI121\|/(\|SGI121\| + TP1) | 0.0011 |
| HIF122 | 0.4474 | HIF122/HOI | 0.5456 | SGI122 | 0.1475 | \|SGI122\|/(\|SGI122\| + TP1) | 0.3402 |
| HIF311 | 0.1227 | HIF311/HOI | 0.1497 | SGI311 | −0.0129 | \|SGI311\|/(\|SGI311\| + TP3) | 0.0369 |
| HIF321 | 0.3918 | HIF321/HOI | 0.4778 | SGI321 | −0.1630 | \|SGI321\|/(\|SGI321\| + TP3) | 0.3267 |
| HIF411 | 0.4171 | HIF411/HOI | 0.5087 | SGI411 | −0.1276 | \|SGI411\|/(\|SGI411\| + TP4) | 0.4043 |
| HIF421 | 0.2061 | HIF421/HOI | 0.2513 | SGI421 | 0.020418 | \|SGI421\|/(\|SGI421\| + TP4) | 0.0980 |
| HIF422 | 0.5088 | HIF422/HOI | 0.6204 | SGI422 | 0.0291 | \|SGI422\|/(\|SGI422\| + TP4) | 0.1341 |

Fourth Embodiment

Figure 4A:
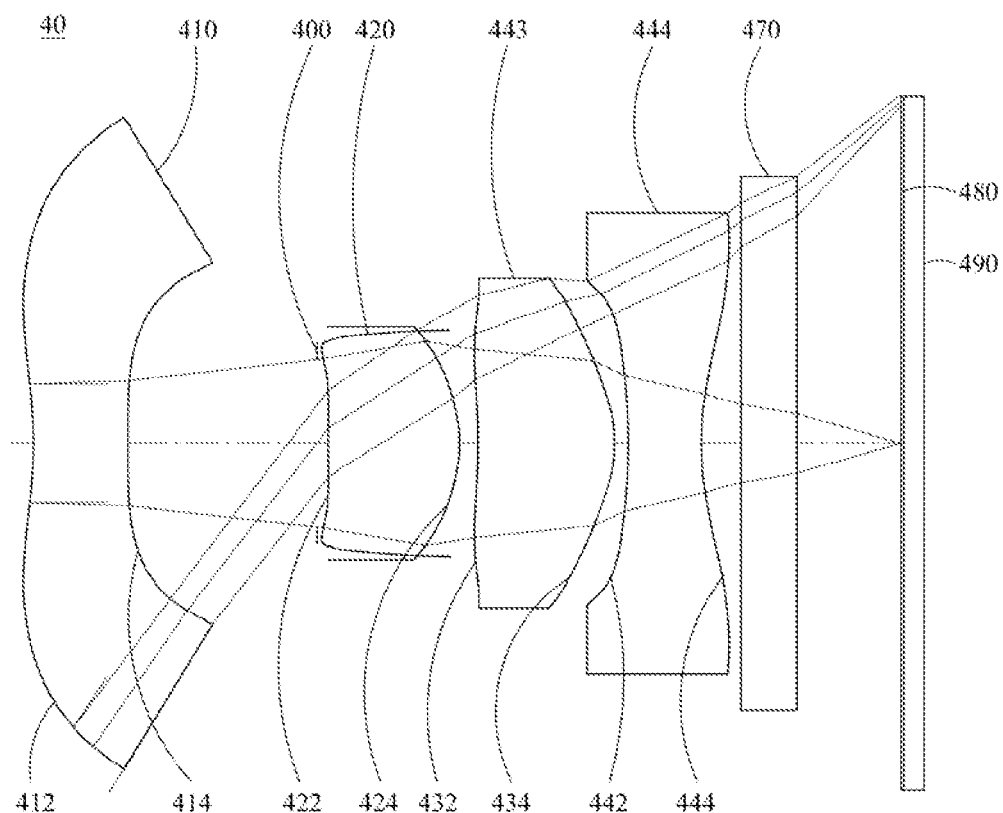
FIG. 4A is a schematic view of the optical image capturing system according to the fourth embodiment of the present invention.
Figure 4B:
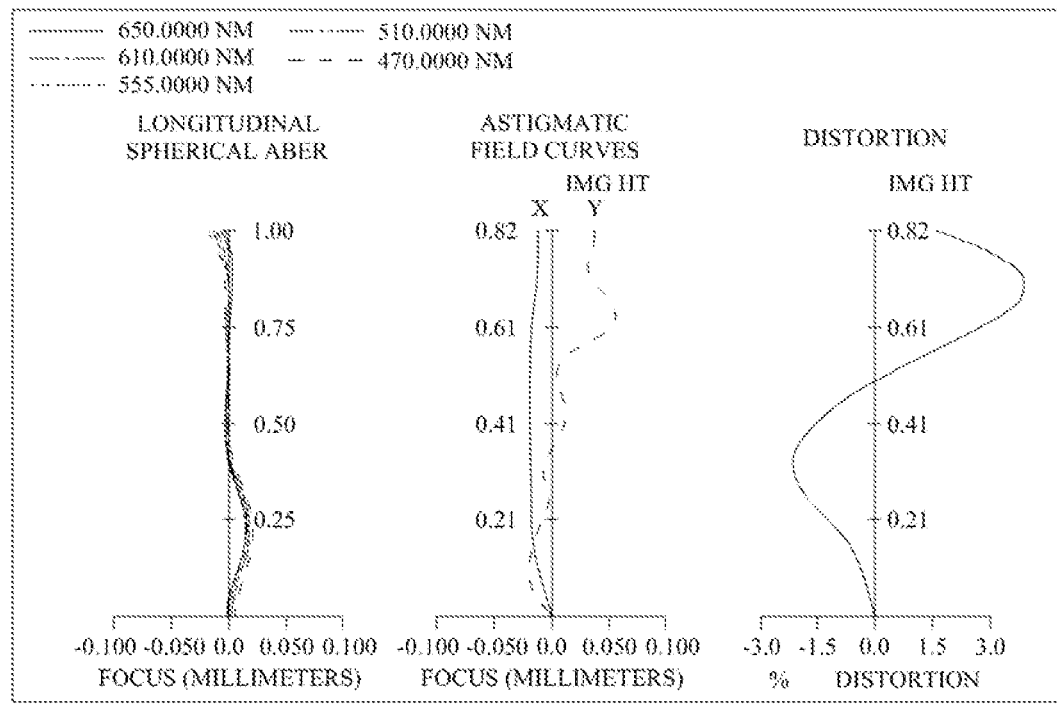
FIG. 4B is a curve diagram illustrating the spherical aberration, astigmatism and optical distortion of the optical image capturing system in order from left to right according to the fourth embodiment of the present invention.
Figure 4C:
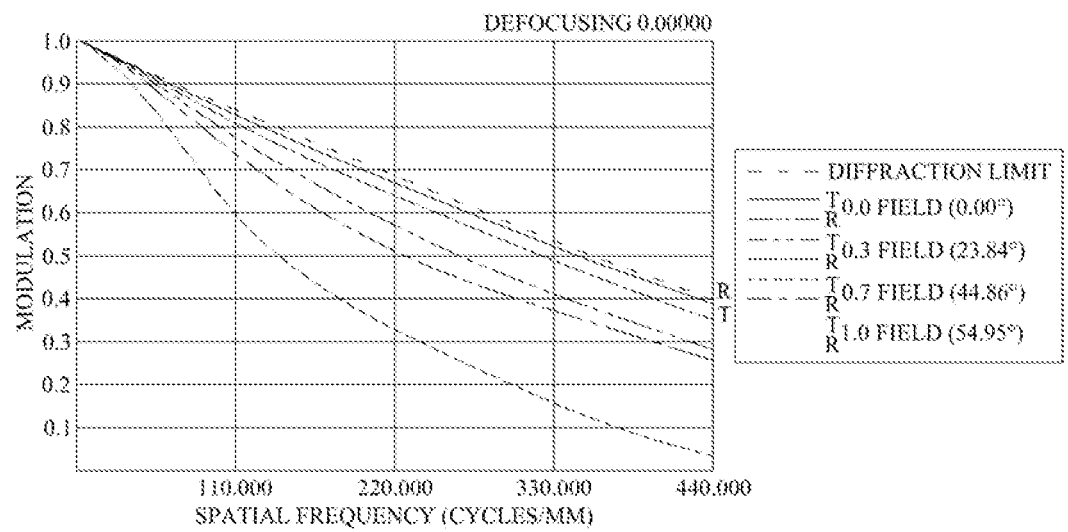
FIG. 4C is a characteristic diagram of modulation transfer of visible light spectrum for the optical image capturing system according to the fourth embodiment of the present invention.

Please refer to FIGS. 4A to 4C. FIG. 4A is a schematic view of the optical image capturing system according to the fourth embodiment of the present invention. FIG. 4B is a curve diagram illustrating the spherical aberration, astigmatism and optical distortion of the optical image capturing system in order from left to right according to the fourth embodiment of the present invention. FIG. 4C is a characteristic diagram of modulation transfer of visible light spectrum for the optical image capturing system according to the fourth embodiment of the present invention. As shown in FIG. 4A, an optical image capturing system includes, in the order from the object side to the image side, a first lens 410, an aperture 400, a second lens 420, a third lens 430, a fourth lens 440, an IR-cut filter 470, an image plane 480, and an image sensor element 490.

The first lens 410 has negative refractive power and is made of plastic. The object side 412 of the first lens 410 is a concave surface and the image side 414 of the first lens 410 is a concave surface, and the object side 412 and the image side 414 are aspheric. The object side 412 has one inflection point.

The second lens 420 has positive refractive power and is made of plastic. The object side 422 of the second lens 420 is a convex surface and the image side 424 of the second lens 420 is a convex surface, and the object side 422 and the image side 424 are aspheric. The object side 422 has one inflection point.

The third lens 430 has positive refractive power and is made of plastic. An object side 432 of the third lens 430 is a convex surface and an image side 434 of the third lens 430 is a concave surface, and the object side 432 and the image side 434 are both aspheric. The object side 432 has one inflection point.

The fourth lens 440 has negative refractive power and is made of plastic. An object side 442 of the fourth lens 440 is a concave surface and an image side 444 of the fourth lens 440 is a convex surface, and the object side 442 and the image side 444 are both aspheric. The image side 444 has one inflection point.

The IR-cut filter 470 is made of glass, and disposed between the fourth lens 440 and the image plane 480, and does not affect the focal length of the optical image capturing system.

Please refer to table 7 and table 8.

TABLE 7

Lens Parameters for the Fourth Embodiment
f = 0.5667 mm; f/HEP = 2.0; HAF = 55.0000 deg

| Surface | | Curvature Radius | Thickness (mm) | Material | Refractive index | Dispersion coefficient | Focal length |
|---|---|---|---|---|---|---|---|
| 0 | Object | 1E+18 | 1E+18 | | | | |
| 1 | Lens 1 | −0.859226571 | 0.244 | Plastic | 1.515 | 56.550 | −1.531 |
| 2 | | 10.84117604 | 0.483 | | | | |
| 3 | Aperture | 1E+18 | 0.033 | | | | |
| 4 | Lens 2 | 228.5100166 | 0.334 | Plastic | 1.515 | 56.550 | 0.662 |
| 5 | | −0.342225177 | 0.020 | | | | |
| 6 | Lens 3 | −1.248936919 | 0.379 | Plastic | 1.544 | 56.090 | 0.583 |
| 7 | | −0.278813782 | 0.035 | | | | |
| 8 | Lens 4 | −0.956451785 | 0.187 | Plastic | 1.671 | 19.233 | −0.508 |
| 9 | | 0.580522091 | 0.104 | | | | |
| 10 | IR-cut filter | 1E+18 | 0.145 | BK7_SCHOTT | 1.517 | 64.167 | |
| 11 | | 1E+18 | 0.286 | | | | |
| 12 | Image plane | 1E+18 | 0.000 | | | | |

Reference wavelength = 555 nm; shield position: the clear aperture of the first surface is 0.783 mm, and the clear aperture of the sixth surface is 0.355 mm.

Table 8 is the aspheric coefficients of the fourth embodiment.

TABLE 8

| Aspheric Coefficients | | | | | | |
|---|---|---|---|---|---|---|
| Surface | 1 | 2 | 4 | 5 | 6 | 7 |
| k= | −1.984141E+01 | −9.000000E+01 | −9.000000E+01 | −1.672913E+00 | −2.178509E+01 | −2.629780E+00 |
| A4= | 1.740275E+00 | 4.615308E+00 | −2.114809E+01 | 1.859684E+00 | 4.462663E+00 | 6.914368E+00 |
| A6= | 6.978210E−01 | 5.977428E+01 | 3.653724E+03 | −1.629458E+02 | 3.798622E+00 | −3.875505E+01 |
| A8= | −4.540606E+01 | −1.805485E+03 | −4.249629E+05 | 6.761600E+03 | −1.660456E+03 | −2.486647E+03 |
| A10= | 2.946318E+02 | 2.692485E+04 | 2.818882E+07 | −2.261195E+05 | 4.687281E+04 | 6.892804E+04 |
| A12= | −1.020495E+03 | −2.340393E+05 | −1.142956E+09 | 4.673621E+06 | −7.047944E+05 | −8.688363E+05 |
| A14= | 2.143769E+03 | 1.211597E+06 | 2.872745E+10 | −5.855575E+07 | 6.361025E+06 | 6.213238E+06 |
| A16= | −2.721983E+03 | −3.481534E+06 | −4.351594E+11 | 4.276857E+08 | −3.431823E+07 | −2.579683E+07 |
| A18= | 1.925917E+03 | 4.810906E+06 | 3.612052E+12 | −1.647147E+09 | 1.017641E+08 | 5.772047E+07 |
| A20= | −5.838729E+02 | −2.081335E+06 | −1.245840E+13 | 2.520859E+09 | −1.277000E+08 | −5.357305E+07 |

| Surface | 8 | 9 |
|---|---|---|
| k= | −9.000000E+01 | −6.214790E+00 |
| A4= | −8.510116E−01 | −2.708063E+00 |
| A6= | 1.450096E+02 | 3.296757E+01 |
| A8= | −6.176539E+03 | −3.658391E+02 |
| A10= | 1.144661E+05 | 2.909933E+03 |
| A12= | −1.217166E+06 | −1.613966E+04 |
| A14= | 7.736014E+06 | 5.873011E+04 |
| A16= | −2.902780E+07 | −1.311416E+05 |
| A18= | 5.883393E+07 | 1.616065E+05 |
| A20= | −4.930180E+07 | −8.365466E+04 |

In the fourth embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 7 and table 8.

| Fourth embodiment (Reference wavelength = 555 nm) | | | | | |
|---|---|---|---|---|---|
| MTFE0 | MTFE3 | MTFE7 | MTFQ0 | MTFQ3 | MTFQ7 |
| 0.93 | 0.9 | 0.85 | 0.84 | 0.78 | 0.6 |
| ETP1 | ETP2 | ETP3 | ETP4 | ED12/ED23 | SED |
| 0.257 | 0.308 | 0.354 | 0.210 | 11.909 | 0.611 |
| ETP1/TP1 | ETP2/TP2 | ETP3/TP3 | ETP4/TP4 | ED23/ED34 | SETP |
| 1.053 | 0.922 | 0.934 | 1.123 | 0.738 | 1.129 |
| ETL | EBL | EIN | EIR | PIR | STP |
| 2.260 | 0.520 | 1.740 | 0.088 | 0.104 | 1.144 |
| EIN/ETL | SETP/EIN | EIR/PIR | EBL/BL | BL | SETP/STP |
| 0.770 | 0.649 | 0.852 | 1.0083 | 0.5157 | 0.987 |
| ED12 | ED23 | ED34 | ED12/IN12 | ED23/IN23 | ED34/IN34 |
| 0.510 | 0.043 | 0.058 | 0.988 | 2.142 | 1.666 |
| InRS41 | InRS42 | HVT41 | HVT42 | ODT % | TDT % |
| −0.09947 | 0.06926 | 0.00000 | 0.47648 | 3.92993 | 4.10844 |
| \|f/f1\| | \|f/f2\| | \|f/f3\| | \|f/f4\| | \|f1/f2\| | \|f2/f3\| |
| 0.37012 | 0.85582 | 0.97182 | 1.11460 | 2.31227 | 1.13554 |
| ΣPPR | ΣNPR | ΣPPR/\|ΣNPR\| | ΣPP | ΣNP | f1/ΣPP |
| 1.82763 | 1.48472 | 1.23096 | 1.24541 | −2.03973 | 0.53173 |
| f4/ΣNP | IN12/f | IN23/f | IN34/f | TP3/f | TP4/f |
| 0.75071 | 0.91075 | 0.08607 | 0.06153 | 0.61826 | 0.32958 |
| InTL | HOS | HOS/HOI | InS/HOS | InTL/HOS | ΣTP/InTL |
| 1.71474 | 2.23045 | 2.72006 | 0.67426 | 0.76879 | 0.65020 |
| (TP1 + IN12)/TP2 | (TP4 + IN34)/TP3 | TP1/TP2 | TP3/TP4 | IN23/(TP2 + IN23 + TP3) | |
| 2.27346 | 0.63261 | 0.72887 | 1.87589 | 0.06651 | |
| \|InRS41\|/TP4 | \|InRS42\|/TP4 | HVT42/HOI | HVT42/HOS | | |
| 0.5325 | 0.3708 | 0.5811 | 0.2136 | | |

The values stated as follows can be obtained according to table 7 and table 8.

Values Related to Inflection Point of Fourth Embodiment
(Primary Reference Wavelength = 555 nm)

| | | | | | | | |
|---|---|---|---|---|---|---|---|
| HIF111 | 0.1632 | HIF111/HOI | 0.1990 | SGI111 | −0.0123 | \|SGI111\|/(\|SGI111\| + TP1) | 0.0480 |
| HIF211 | 0.0042 | HIF211/HOI | 0.0051 | SGI211 | 0.0000 | \|SGI211\|/(\|SGI211\| + TP2) | 0.0000 |
| HIF311 | 0.1167 | HIF311/HOI | 0.1423 | SGI311 | −0.0044 | \|SGI311\|/(\|SGI311\| + TP3) | 0.0125 |
| HIF421 | 0.2427 | HIF421/HOI | 0.2960 | SGI421 | 0.0370 | \|SGI421\|/(\|SGI421\| + TP4) | 0.1655 |

Fifth Embodiment

Figure 5A:
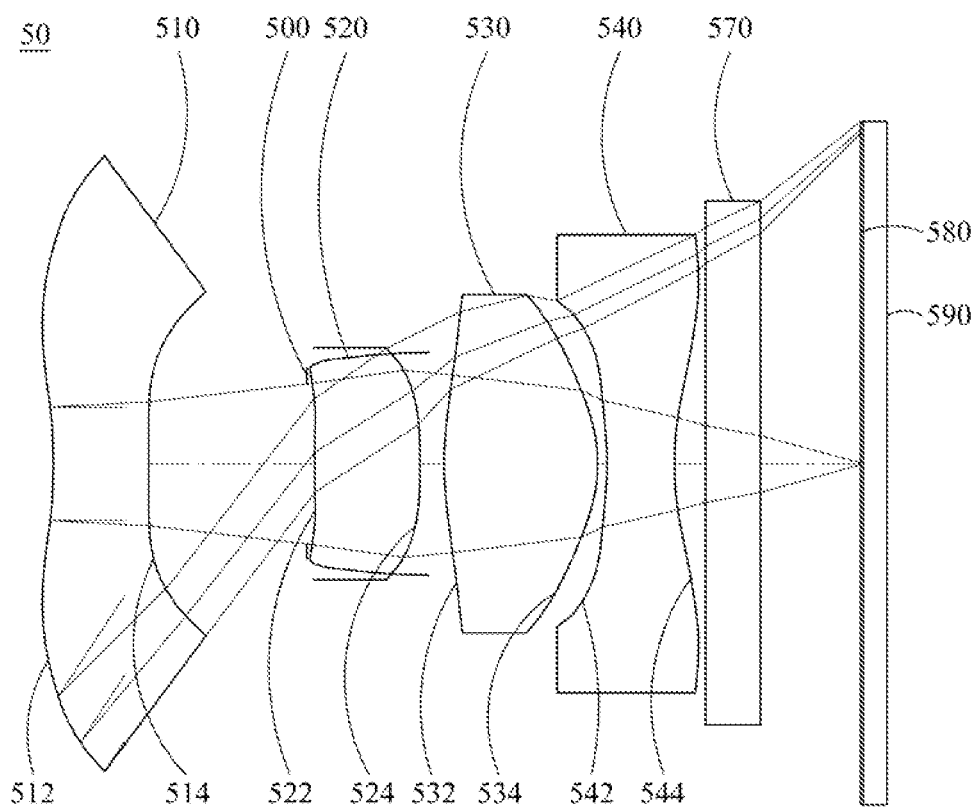
FIG. 5A is a schematic view of the optical image capturing system according to the fifth embodiment of the present invention.
Figure 5B:
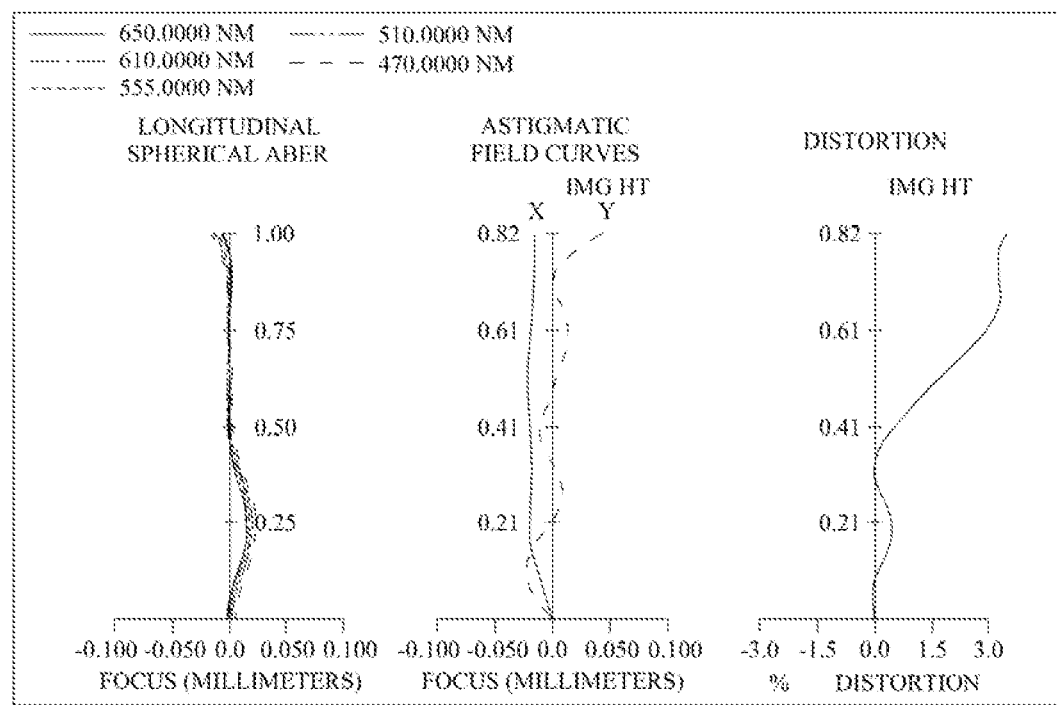
FIG. 5B is a curve diagram illustrating the spherical aberration, astigmatism and optical distortion of the optical image capturing system in order from left to right according to the fifth embodiment of the present invention.
Figure 5C:
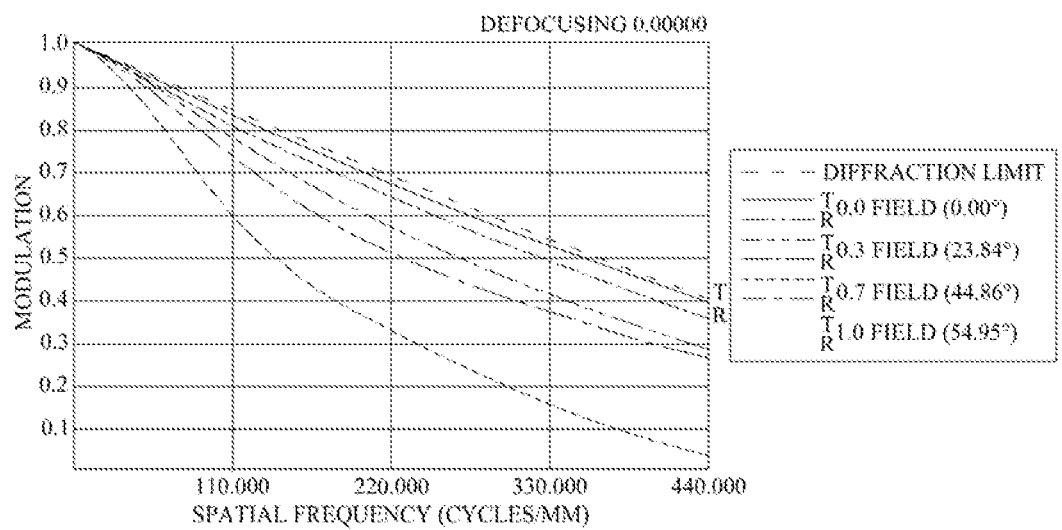
FIG. 5C is a characteristic diagram of modulation transfer of visible light spectrum for the optical image capturing system according to the fifth embodiment of the present invention.

Please refer to FIGS. 5A to 5C. FIG. 5A is a schematic view of the optical image capturing system according to the fifth embodiment of the present invention. FIG. 5B is a curve diagram illustrating the spherical aberration, astigmatism and optical distortion of the optical image capturing system in order from left to right according to the fifth embodiment of the present invention. FIG. 5C is a characteristic diagram of modulation transfer of visible light spectrum for the optical image capturing system according to the fifth embodiment of the present invention. As shown in FIG. 5A, an optical image capturing system includes, in the order from the object side to the image side, a first lens 510, an aperture 500, a second lens 520, a third lens 530, a fourth lens 540, an IR-cut filter 570, an image plane 580, and an image sensor element 590.

The first lens 510 has negative refractive power and is made of plastic. The object side 512 of the first lens 510 is a convex surface and the image side 514 of the first lens 510 is a concave surface, and the object side 512 and the image side 514 are aspheric. The object side 512 has one inflection point and the image side 514 has one inflection point.

The second lens 520 has positive refractive power and is made of plastic. The object side 522 of the second lens 520 is a convex surface and the image side 524 of the second lens 520 is a concave surface, and the object side 522 and the image side 524 are aspheric. The object side 522 has one inflection point.

The third lens 530 has positive refractive power and is made of plastic. An object side 532 of the third lens 530 is a convex surface and an image side 534 of the third lens 530 is a convex surface, and the object side 532 and the image side 534 are both aspheric. The object side 532 has two inflection points.

The fourth lens 540 has negative refractive power and is made of plastic. An object side 542 of the fourth lens 540 is a convex surface and an image side 544 of the fourth lens 540 is a convex surface, and the object side 542 and the image side 544 are both aspheric. The image side 544 has one inflection point.

The IR-cut filter 570 is made of glass, and disposed between the fourth lens 540 and the image plane 580, and does not affect the focal length of the optical image capturing system.

Please refer to table 9 and table 10.

TABLE 9

Lens Parameters for Fifth Embodiment
f = 0.5551 mm; f/HEP = 2.0; HAF = 55.0000 deg

| Surface | | Curvature Radius | Thickness (mm) | Material | Refractive index | Dispersion coefficient | Focal length |
|---|---|---|---|---|---|---|---|
| 0 | Object | 1E+18 | 1E+18 | | | | |
| 1 | Lens 1 | −0.685714375 | 0.250 | Plastic | 1.515 | 56.549 | −1.462 |
| 2 | | −8.403385289 | 0.417 | | | | |
| 3 | Aperture | 1E+18 | 0.022 | | | | |
| 4 | Lens 2 | 3.305269323 | 0.279 | Plastic | 1.515 | 56.549 | 2.017 |
| 5 | | −1.476760997 | 0.066 | | | | |
| 6 | Lens 3 | 0.68866989 | 0.405 | Plastic | 1.544 | 56.090 | 0.428 |
| 7 | | −0.280108168 | 0.022 | | | | |
| 8 | Lens 4 | −0.900970706 | 0.180 | Plastic | 1.671 | 19.233 | −0.501 |
| 9 | | 0.588675632 | 0.084 | | | | |
| 10 | IR-cut filter | 1E+18 | 0.145 | BK_7 | 1.517 | 64.167 | |
| 11 | | 1E+18 | 0.265 | | | | |
| 12 | Image plane | 1E+18 | 0.000 | | | | |

Reference wavelength = 555 nm; shield position: the clear aperture of the first surface is 0.826 mm, the clear aperture of the fourth surface is 0.205 mm, the clear aperture of the fifth surface is 0.374 mm.

Table 10 is the aspheric coefficients of the fifth embodiment.

TABLE 10

Aspheric Coefficients

| Surface | 1 | 2 | 4 | 5 | 6 | 7 |
|---|---|---|---|---|---|---|
| k= | −1.984142E+01 | −9.000000E+01 | −9.000000E+01 | −1.142740E−14 | −2.178509E+01 | −3.292128E+00 |
| A4= | 1.651324E+00 | 7.177575E+00 | −1.995343E+01 | −1.052946E+01 | −7.673498E−01 | 5.760775E+00 |
| A6= | 6.951250E−01 | 1.895609E+01 | 3.635636E+03 | −4.620253E+01 | 2.100021E+01 | −4.142436E+01 |
| A8= | −4.531825E+01 | −1.506953E+03 | −4.249153E+05 | 5.987280E+03 | −1.703061E+03 | −2.450405E+03 |
| A10= | 2.940413E+02 | 2.595185E+04 | 2.818849E+07 | −2.242094E+05 | 4.705252E+04 | 6.888262E+04 |
| A12= | −1.020495E+03 | −2.340393E+05 | −1.142956E+09 | 4.673621E+06 | −7.047944E+05 | −8.688363E+05 |
| A14= | 2.143769E+03 | 1.211597E+06 | 2.872745E+10 | −5.855575E+07 | 6.361025E+06 | 6.213238E+06 |
| A16= | −2.721983E+03 | −3.481534E+06 | −4.351594E+11 | 4.276857E+08 | −3.431823E+07 | −2.579683E+07 |
| A18= | 1.925917E+03 | 4.810906E+06 | 3.612052E+12 | −1.647147E+09 | 1.017641E+08 | 5.772047E+07 |
| A20= | −5.838729E+02 | −2.081335E+06 | −1.245840E+13 | 2.520859E+09 | −1.277000E+08 | −5.357305E+07 |

| Surface | 8 | 9 |
|---|---|---|
| k= | −9.000000E+01 | −3.453021E+00 |
| A4= | −1.757060E+00 | −4.494091E+00 |
| A6= | 1.356734E+02 | 4.161750E+01 |
| A8= | −6.076755E+03 | −3.856488E+02 |
| A10= | 1.143884E+05 | 2.929142E+03 |
| A12= | −1.217166E+06 | −1.613966E+04 |
| A14= | 7.736014E+06 | 5.873011E+04 |
| A16= | −2.902780E+07 | −1.311416E+05 |
| A18= | 5.883393E+07 | 1.616065E+05 |
| A20= | −4.930180E+07 | −8.365466E+04 |

In the fifth embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 9 and table 10.

| Fifth embodiment (Reference wavelength = 555 nm) | | | | | |
|---|---|---|---|---|---|
| MTFE0 | MTFE3 | MTFE7 | MTFQ0 | MTFQ3 | MTFQ7 |
| 0.93 | 0.91 | 0.84 | 0.84 | 0.78 | 0.59 |
| ETP1 | ETP2 | ETP3 | ETP4 | ED12/ED23 | SED |
| 0.262 | 0.268 | 0.365 | 0.202 | 4.982 | 0.569 |
| ETP1/TP1 | ETP2/TP2 | ETP3/TP3 | ETP4/TP4 | ED23/ED34 | SETP |
| 1.052 | 0.961 | 0.900 | 1.124 | 2.033 | 1.098 |
| ETL | EBL | EIN | EIR | PIR | STP |
| 2.146 | 0.479 | 1.667 | 0.070 | 0.084 | 1.114 |
| EIN/ETL | SETP/EIN | EIR/PIR | EBL/BL | BL | SETP/STP |
| 0.777 | 0.658 | 0.829 | 0.9671 | 0.4953 | 0.986 |
| ED12 | ED23 | ED34 | ED12/IN12 | ED23/IN23 | ED34/IN34 |
| 0.438 | 0.088 | 0.043 | 0.998 | 1.330 | 1.928 |
| InRS41 | InRS42 | HVT41 | HVT42 | ODT % | TDT % |
| −0.12313 | 0.05832 | 0.00000 | 0.46117 | 3.45985 | 2.04901 |
| \|f/f1\| | \|f/f2\| | \|f/f3\| | \|f/f4\| | \|f1/f2\| | \|f2/f3\| |
| 0.37961 | 0.27520 | 1.29705 | 1.10743 | 0.72495 | 4.71308 |
| ΣPPR | ΣNPR | ΣPPR/\|ΣNPR\| | ΣPP | ΣNP | f1/ΣPP |
| 1.38263 | 1.67666 | 0.82463 | 1.51589 | −1.03435 | −0.33068 |
| f4/ΣNP | IN12/f | IN23/f | IN34/f | TP3/f | TP4/f |
| 1.41378 | 0.79094 | 0.11909 | 0.04041 | 0.73001 | 0.32425 |
| InTL | HOS | HOS/HOI | InS/HOS | InT/HOS | ΣTP/InTL |
| 1.64117 | 2.13644 | 2.60541 | 0.68785 | 0.76818 | 0.67852 |
| (TP1 + IN12)/TP2 | (TP4 + IN34)/TP3 | TP1/TP2 | TP3/TP4 | IN23/(TP2 + IN23 + TP3) | |
| 2.47041 | 0.49953 | 0.89528 | 2.25138 | 0.08813 | |
| \|InRS41\|/TP4 | \|InRS42\|/TP4 | HVT42/HOI | HVT42/HOS | | |
| 0.6840 | 0.3240 | 0.5624 | 0.2159 | | |

The values stated as follows can be obtained according to table 9 and table 10.

Values Related to Inflection Point of Fifth Embodiment
(Primary Reference Wavelength = 555 nm)

| | | | | | | | |
|---|---|---|---|---|---|---|---|
| HIF111 | 0.1617 | HIF111/HOI | 0.1972 | SGI111 | −0.0146 | \|SGI111\|/(\|SGI111\| + TP1) | 0.0551 |
| HIF121 | 0.0370 | HIF121/HOI | 0.0451 | SGI121 | −0.0001 | \|SGI121\|/(\|SGI121\| + TP1) | 0.0003 |
| HIF211 | 0.0740 | HIF211/HOI | 0.0903 | SGI211 | 0.00054805 | \|SGI211\|/(\|SGI211\| + TP2) | 0.0020 |
| HIF311 | 0.1712 | HIF311/HOI | 0.2088 | SGI311 | 0.0162 | \|SGI311\|/(\|SGI311\| + TP3) | 0.0385 |
| HIF312 | 0.3045 | HIF312/HOI | 0.3713 | SGI312 | 0.0331 | \|SGI312\|/(\|SGI312\| + TP3) | 0.0756 |
| HIF421 | 0.2148 | HIF421/HOI | 0.2619 | SGI421 | 0.0296681 | \|SGI421\|/(\|SGI421\| + TP4) | 0.1415 |

Sixth Embodiment

Figure 6A:
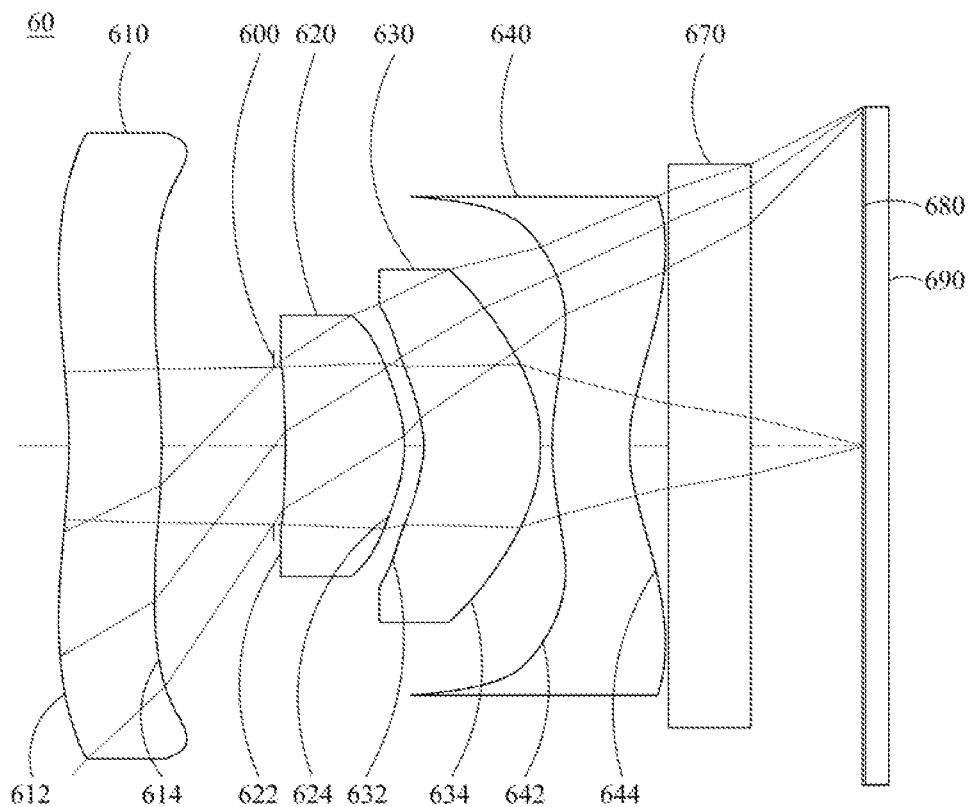
FIG. 6A is a schematic view of the optical image capturing system according to the sixth embodiment of the present invention.
Figure 6B:
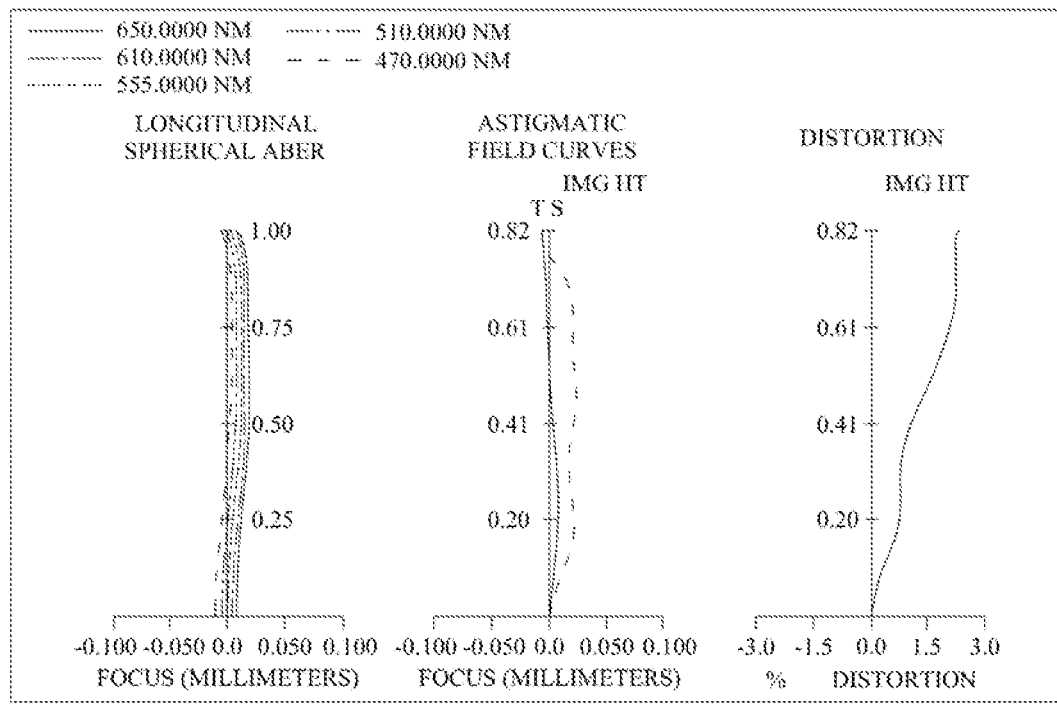
FIG. 6B is a curve diagram illustrating the spherical aberration, astigmatism and optical distortion of the optical image capturing system in order from left to right according to the sixth embodiment of the present invention.
Figure 6C:
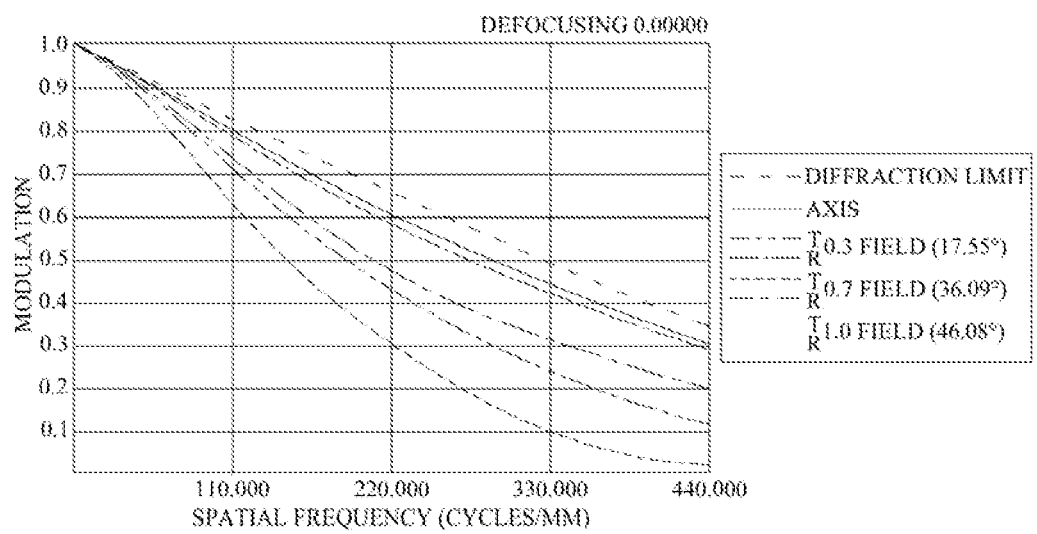
FIG. 6C is a characteristic diagram of modulation transfer of visible light spectrum for the optical image capturing system according to the sixth embodiment of the present invention.

Please refer to FIGS. 6A to 6C. FIG. 6A is a schematic view of the optical image capturing system according to the sixth embodiment of the present invention. FIG. 6B is a curve diagram illustrating the spherical aberration, astigmatism and optical distortion of the optical image capturing system in order from left to right according to the sixth embodiment of the present invention. FIG. 6C is a characteristic diagram of modulation transfer of visible light spectrum for the optical image capturing system according to the sixth embodiment of the present invention. As shown in FIG. 6A, an optical image capturing system includes, in the order from the object side to the image side, a first lens 610, an aperture 600, a second lens 620, a third lens 630, a fourth lens 640, an IR-cut filter 670, an image plane 680, and an image sensor element 690.

The first lens 610 has negative refractive power and is made of plastic. The object side 612 of the first lens 610 is a convex surface and the image side 614 of the first lens 610 is a concave surface, and the object side 612 and the image side 614 are aspheric. The object side 612 has one inflection point.

The second lens 620 has positive refractive power and is made of plastic. The object side 622 of the second lens 620 is a convex surface and the image side 624 of the second lens 620 is a convex surface, and the object side 622 and the image side 624 are aspheric. The object side 622 has one inflection point.

The third lens 630 has positive refractive power and is made of plastic. An object side 632 of the third lens 630 is a concave surface and an image side 634 of the third lens 630 is a convex surface, and the object side 632 and the image side 634 are both aspheric. The object side 632 has one inflection point and the image side 634 has one inflection point.

The fourth lens 640 has negative refractive power and is made of plastic. An object side 642 of the fourth lens 640 is a convex surface and an image side 644 of the fourth lens 640 is a concave surface, and the object side 642 and the image side 644 are both aspheric. The object side 642 has one inflection point and the image side 644 has two inflection points.

The IR-cut filter 670 is made of glass, and disposed between the fourth lens 640 and the image plane 680, and does not affect the focal length of the optical image capturing system.

Please refer to table 11 and table 12.

TABLE 11

Lens Parameters for Sixth Embodiment
f = 1.5275 mm; f/HEP =1.8; HAF = 60.0022 deg

| Surface | | Curvature Radius | Thickness (mm) | Material | Refractive index | Dispersion coefficient | Focal length |
|---|---|---|---|---|---|---|---|
| 0 | Object | 1E+18 | 600 | | | | |
| 1 | Lens 1 | −1.382040458 | 0.243 | Plastic | 1.593 | 30.953 | 27.059 |
| 2 | | −1.356607194 | 0.290 | | | | |
| 3 | Aperture | 1E+18 | 0.028 | | | | |
| 4 | Lens 2 | −5.186609288 | 0.309 | Plastic | 1.544 | 55.990 | 0.603 |
| 5 | | −0.3157793 | 0.050 | | | | |
| 6 | Lens 3 | −0.273043179 | 0.305 | Plastic | 1.544 | 55.990 | 6.094 |
| 7 | | −0.351715983 | 0.030 | | | | |
| 8 | Lens 4 | 0.611503978 | 0.200 | Plastic | 1.661 | 20.373 | −2.663 |
| 9 | | 0.395362662 | 0.103 | | | | |
| 10 | IR-cut filter | 1E+18 | 0.210 | BK_7 | 1.517 | 64.167 | |
| 11 | | 1E+18 | 0.290 | | | | |
| 12 | Image plane | 1E+18 | 0.000 | | | | |

Reference wavelength = 555 nm; shield position: none

Table 12 is the aspheric coefficients of the sixth embodiment.

TABLE 12

| Aspheric Coefficients | | | | | | |
|---|---|---|---|---|---|---|
| Surface | 1 | 2 | 4 | 5 | 6 | 7 |
| k= | −1.093228E+01 | −9.355422E+00 | 2.319221E+02 | −2.930194E+00 | −3.820497E+00 | −2.438138E+00 |
| A4= | 1.642398E+00 | 2.652881E+00 | −2.766342E+00 | 2.257175E+00 | 4.505594E+00 | −1.533162E+00 |
| A6= | −6.408371E+00 | −1.697242E+01 | 6.860344E+01 | −5.287398E+01 | −4.143975E+01 | −1.467779E+01 |
| A8= | 1.819485E+01 | 8.012419E+01 | −3.306386E+03 | 1.201827E+03 | 5.716054E+02 | 2.665607E+02 |
| A10= | −2.731585E+01 | −2.303803E+02 | 4.874617E+04 | −2.252802E+04 | −8.719212E+03 | −2.113045E+03 |
| A12= | −1.939094E+00 | 3.693667E+02 | −1.824106E+05 | 1.666477E+05 | 5.692369E+04 | 8.673964E+03 |
| A14= | 9.758090E+01 | −2.465122E+02 | −2.002386E+06 | −5.011750E+05 | −1.470294E+05 | −1.442327E+04 |
| A16= | −1.928534E+02 | 0.000000E+00 | 0.000000E+00 | 0.000000E+00 | 0.000000E+00 | 0.000000E+00 |
| A18= | 1.708771E+02 | 0.000000E+00 | 0.000000E+00 | 0.000000E+00 | 0.000000E+00 | 0.000000E+00 |
| A20= | −5.996138E+01 | 0.000000E+00 | 0.000000E+00 | 0.000000E+00 | 0.000000E+00 | 0.000000E+00 |

| Surface | 8 | 9 |
|---|---|---|
| k= | −6.545896E+00 | −4.562938E+00 |
| A4= | −3.548071E+00 | −2.960035E+00 |
| A6= | 8.412776E+00 | 1.885766E+01 |
| A8= | −7.896627E+01 | −1.140849E+02 |
| A10= | 8.250840E+02 | 4.609731E+02 |
| A12= | −5.647821E+03 | −1.152371E+03 |
| A14= | 1.900139E+04 | 1.595947E+03 |
| A16= | −2.366638E+04 | −9.236688E+02 |
| A18= | 0.000000E+00 | 0.000000E+00 |
| A20= | 0.000000E+00 | 0.000000E+00 |

In the sixth embodiment, the aspheric surface formula is presented in the same way in the first embodiment. In addition, the definitions of parameters in following tables are the same as those in the first embodiment. Therefore, similar description shall not be illustrated again.

The values stated as follows can be obtained according to table 11 and table 12.

| Sixth embodiment (Reference wavelength = 555 nm) | | | | | |
|---|---|---|---|---|---|
| MTFE0 | MTFE3 | MTFE7 | MTFQ0 | MTFQ3 | MTFQ7 |
| 0.92 | 0.88 | 0.85 | 0.8 | 0.71 | 0.63 |
| ETP1 | ETP2 | ETP3 | ETP4 | ED12/ED23 | SED |
| 0.243 | 0.273 | 0.305 | 0.212 | 6.497 | 0.462 |
| ETP1/TP1 | ETP2/TP2 | ETP3/TP3 | ETP4/TP4 | ED23/ED34 | SETP |
| 1.002 | 0.884 | 1.001 | 1.058 | 0.546 | 1.033 |
| ETL | EBL | EIN | EIR | PIR | STP |
| 2.067 | 0.572 | 1.495 | 0.072 | 0.103 | 1.056 |
| EIN/ETL | SETP/EIN | EIR/PIR | EBL/BL | BL | SETP/STP |
| 0.723 | 0.691 | 0.699 | 0.2593 | 2.2057 | 0.978 |
| ED12 | ED23 | ED34 | ED12/IN12 | ED23/IN23 | ED34/IN34 |
| 0.322 | 0.050 | 0.091 | 1.010 | 0.991 | 3.028 |
| InRS41 | InRS42 | HVT41 | HVT42 | ODT % | TDT % |
| −0.06599 | 0.25845 | 0.92830 | 0.00000 | −5.87663 | 6.09688 |
| \|f/f1\| | \|f/f2\| | \|f/f3\| | \|f/f4\| | \|f1/f2\| | \|f2/f3\| |
| 0.39080 | 0.44635 | 0.48922 | 0.40358 | 1.14215 | 1.09604 |
| ΣPPR | ΣNPR | ΣPPR/\|ΣNPR\| | ΣPP | ΣNP | f1/ΣPP |
| 1.33916 | 0.39080 | 3.42671 | 2.75970 | −3.90875 | −1.37151 |
| f4/ΣNP | IN12/f | IN23/f | IN34/f | TP3/f | TP4/f |
| 1.00000 | 3.70352 | 0.59415 | 0.03273 | 0.78404 | 0.28055 |
| InTL | HOS | HOS/HOI | InS/HOS | InTL/HOS | ΣTP/InTL |
| 12.80830 | 15.01400 | 6.00560 | 0.37094 | 0.85309 | 0.48355 |
| (TP1 + IN12)/TP2 | (TP4 + IN34)/TP3 | TP1/TP2 | TP3/TP4 | IN23/(TP2 + IN23 + TP3) | |
| 12.40134 | 0.39957 | 4.98628 | 2.79466 | 0.31643 | |
| \|InRS41\|/TP4 | \|InRS42\|/TP4 | HVT42/HOI | HVT42/HOS | | |
| 0.1540 | 0.6031 | 0.0000 | 0.0000 | | |

The values stated as follows can be obtained according to table 11 and table 12.

Values Related to Inflection Point of Sixth Embodiment
(Primary Reference Wavelength = 555 nm)

| | | | | | | | |
|---|---|---|---|---|---|---|---|
| HIF111 | 6.3572 | HIF111/HOI | 2.5429 | SGI111 | 1.2171 | \|SGI111\|/(\|SGI111\| + TP1) | 0.2424 |
| HIF211 | 0.6608 | HIF211/HOI | 0.2643 | SGI211 | 0.0481 | \|SGI211\|/(\|SGI211\| + TP2) | 0.0593 |
| HIF311 | 0.5808 | HIF311/HOI | 0.2323 | SGI311 | −0.0109 | \|SGI311\|/(\|SGI311\| + TP3) | 0.0090 |
| HIF321 | 1.6178 | HIF321/HOI | 0.6471 | SGI321 | −0.6866 | \|SGI321\|/(\|SGI321\| + TP3) | 0.3644 |
| HIF411 | 0.5317 | HIF411/HOI | 0.2127 | SGI411 | 0.0245 | \|SGI411\|/(\|SGI411\| + TP4) | 0.0540 |
| HIF421 | 0.8545 | HIF421/HOI | 0.3418 | SGI421 | 0.1226 | \|SGI421\|/(\|SGI421\| + TP4) | 0.2225 |
| HIF422 | 1.4801 | HIF422/HOI | 0.5921 | SGI422 | 0.2432 | \|SGI422\|/(\|SGI422\| + TP4) | 0.3621 |

The above description is merely illustrative rather than restrictive. Any equivalent modification or alteration without departing from the spirit and scope of the present invention should be included in the appended claims.

What is claimed is:

1. An optical image capturing system, from an object side to an image side, comprising:
   a first lens with negative refractive power, wherein an object-side surface of the first lens on the optical axis is a concave surface and has at least one inflection point;
   a second lens with refractive power;
   a third lens with positive refractive power, wherein an object-side surface of the third lens on the optical axis is a concave surface;
   a fourth lens with refractive power; and
   an image plane;
   wherein the optical image capturing system comprises the four lenses with refractive power, at least one of the second lens and the fourth lens has positive refractive power, focal lengths of the first lens through the fourth lens are f1, f2, f3, and f4, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the fourth lens is denoted by InTL, a half maximum angle of view of the optical image capturing system is denoted by HAF, thicknesses of the first lens to the fourth lens at height of ½ HEP parallel to the optical axis are respectively denoted by ETP1, ETP2, ETP3, and ETP4, a sum of ETP1 to ETP4 described above is denoted by SETP, thicknesses of the first lens to the fourth lens on the optical axis are respectively denoted by TP1, TP2, TP3, and TP4, a sum of TP1 to TP4 described above is denoted by STP, and the following conditions are satisfied:
   1.8≤f/HEP≤2.8; 45 deg<HAF≤80 deg; and 0.5≤SETP/STP<1;
   wherein the height of ½ HEP is measured beginning from the optical axis and does not extend beyond a physical diameter of any one of the first lens to the fourth lens.

2. The optical image capturing system according to claim 1, wherein a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the fourth lens at height of ½ HEP is denoted by EIN, and the following condition is satisfied:
   0.2≤EIN/ETL<1.

3. The optical image capturing system according to claim 2, wherein thicknesses of the first lens to the fourth lens at height of ½ HEP parallel to the optical axis are respectively denoted by ETP1, ETP2, ETP3, and ETP4, a sum of ETP1 to ETP4 described above is denoted by SETP, and the following condition is satisfied:
   0.3≤SETP/EIN<1.

4. The optical image capturing system according to claim 1, wherein the second lens has positive refractive power, and an object-side surface of the second lens on the optical axis is a concave surface.

5. The optical image capturing system according to claim 4, wherein an image-side surface of the first lens on the optical axis is a convex surface, and an image-side surface of the second lens on the optical axis is a convex surface.

6. The optical image capturing system according to claim 1, wherein an image-side surface of the third lens on the optical axis is a convex surface.

7. The optical image capturing system according to claim 1, wherein an object-side surface and an image-side surface of the fourth lens on the optical axis are convex surfaces.

8. The optical image capturing system according to claim 1, wherein modulation transfer rates of visible light at spatial frequency of 55 cycles/mm at positions of the optical axis, 0.3 HOI and 0.7 HOI on the image plane are respectively denoted by MTFE0, MTFE3 and MTFE7, and the following conditions are satisfied:
   MTFE0≥0.2; MTFE3≥0.01; and MTFE7≥0.01.

9. The optical image capturing system according to claim 1, further comprising an aperture, wherein a distance from the aperture to the image plane on the optical axis is denoted by InS, and the following condition is satisfied:
   0.2≤InS/HOS≤1.1.

10. An optical image capturing system, from an object side to an image side, comprising:
    a first lens with negative refractive power, wherein an object-side surface of the first lens on the optical axis is a concave surface and has at least one inflection point;
    a second lens with refractive power;
    a third lens with positive refractive power, wherein an object-side surface of the third lens on the optical axis is a concave surface and has at least one inflection point;
    a fourth lens with refractive power; and
    an image plane;
    wherein the optical image capturing system comprises the four lenses with refractive power, at least one of the second lens and the fourth lens has positive refractive power, focal lengths of the first lens through the fourth lens are f1, f2, f3, and f4, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the fourth lens is denoted by InTL, a half maximum angle of view of the optical image capturing system is denoted by HAF, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the fourth lens at height of ½ HEP is denoted by EIN, and the following conditions are satisfied:

1.8≤f/HEP≤2.8; 45 deg<HAF≤80 deg; and 0.2≤EIN/ETL<1;

wherein the height of ½ HEP is measured beginning from the optical axis and does not extend beyond a physical diameter of any one of the first lens to the fourth lens;

wherein the following condition is satisfied:
f2<f3.

11. The optical image capturing system according to claim 10, wherein the contrast transfer rates (MTF values) with spatial frequencies of 110 cycles/mm at the optical axis, 0.3 HOI, and 0.7 HOI of visible light spectrum on the image plane may be respectively expressed as MTFQ0, MTFQ3 and MTFQ7, and the following conditions are satisfied:
MTFQ0≥0.2; MTFQ3≥0.01; and MTFQ7≥0.01.

12. The optical image capturing system according to claim 10, wherein the following condition is satisfied:
0 mm<HOS≤4 mm.

13. The optical image capturing system according to claim 10, wherein thicknesses of the second lens at height of ½ HEP parallel to the optical axis is denoted by ETP2, a thickness of the second lens on the optical axis is denoted by TP2, and the following condition is satisfied:
0.1≤ETP2/TP2≤5.

14. The optical image capturing system according to claim 10, wherein the second lens has positive refractive power, and an object-side surface of the second lens on the optical axis is a concave surface.

15. The optical image capturing system according to claim 10, wherein the following condition is satisfied:
−2≤f1/f4≤3.

16. The optical image capturing system according to claim 10, wherein a thickness of the second lens on the optical axis is denoted by TP2, a thickness of the third lens on the optical axis is denoted by TP3, and the following condition is satisfied:
0.1≤TP2/TP3≤10.

17. The optical image capturing system according to claim 10, wherein a thickness of the second lens on the optical axis is denoted by TP2, a thickness of the third lens on the optical axis is denoted by TP3, and the following condition is satisfied:
TP2>TP3.

18. An optical image capturing system, from an object side to an image side, comprising:
a first lens with negative refractive power, wherein an object-side surface of the first lens on the optical axis is a concave surface and has at least one inflection point, and an image-side surface of the first lens on the optical axis is a convex surface and has at least one inflection point;

a second lens with positive refractive power, wherein an object-side surface of the second lens on the optical axis is a concave surface;

a third lens with positive refractive power, wherein an object-side surface of the third lens on the optical axis is a concave surface and has at least one inflection point;

a fourth lens with refractive power; and an image plane;

wherein the optical image capturing system comprises the four lenses with refractive power, focal lengths of the first lens through the fourth lens are f1, f2, f3, and f4, respectively, and a focal length of the optical image capturing system is f, the entrance pupil diameter of the optical image capturing system is denoted by HEP, a distance on an optical axis from an object side of the first lens to the image plane is denoted by HOS, a distance on an optical axis from the object side of the first lens to the image side of the fourth lens is denoted by InTL, a half maximum angle of view of the optical image capturing system is denoted by HAF, a horizontal distance parallel to the optical axis from a first coordinate point on the object side of the first lens at height of ½ HEP to the image plane is denoted by ETL, a horizontal distance parallel to the optical axis from the first coordinate point on the object side of the first lens at height of ½ HEP to a second coordinate point on the image side of the fourth lens at height of ½ HEP is denoted by EIN, and the following conditions are satisfied:

1.8≤f/HEP≤2.8; 45 deg<HAF≤80 deg; and 0.2≤EIN/ETL<1;

wherein the height of ½ HEP is measured beginning from the optical axis and does not extend beyond a physical diameter of any one of the first lens to the fourth lens;

wherein an object-side surface and an image-side surface of the fourth lens on the optical axis are concave surfaces.

19. The optical image capturing system according to claim 18, wherein a distance between the third lens and the fourth lens on the optical axis is denoted by IN34, and the following condition is satisfied:
0<IN34/f≤5.

20. The optical image capturing system according to claim 18, wherein the following condition is satisfied:
0.1≤f2/f3≤5.

21. The optical image capturing system according to claim 18, wherein the image-side surface of the fourth lens has at least two inflection points.

22. The optical image capturing system according to claim 18, further comprising an aperture stop, an image sensing device and a driving module, wherein the image sensing device is disposed on the image plane, a distance on the optical axis from the aperture stop to the image plane is denoted by InS, and the driving module couples with the lenses to displace the lenses, and the following condition is satisfied:
0.2≤InS/HOS≤1.1.

* * * * *